US010795466B1

(12) United States Patent
Lo et al.

(10) Patent No.: US 10,795,466 B1
(45) Date of Patent: Oct. 6, 2020

(54) APPARATUSES, SYSTEMS, AND METHODS FOR CONFIGURING PROGRAMMABLE BUTTONS

(71) Applicant: Elysian Labs, Inc, Oakland, CA (US)

(72) Inventors: Joanne Chung-Yan Lo, Oakland, CA (US); Adam Patrick Hutz, El Cerrito, CA (US)

(73) Assignee: Elysian Labs, Inc, Oakland, CA (US)

( * ) Notice: Subject to any disclaimer, the term of this patent is extended or adjusted under 35 U.S.C. 154(b) by 0 days.

(21) Appl. No.: 15/973,752

(22) Filed: May 8, 2018

(51) Int. Cl.
| G06F 3/0362 | (2013.01) |
| G06F 3/02 | (2006.01) |
| H01H 13/52 | (2006.01) |
| H01H 19/00 | (2006.01) |

(52) U.S. Cl.
CPC .......... *G06F 3/0362* (2013.01); *G06F 3/0202* (2013.01); *H01H 13/52* (2013.01); *H01H 19/005* (2013.01); *H01H 2013/525* (2013.01)

(58) Field of Classification Search
CPC ...... G06F 3/02; G06F 3/04855; G06F 3/0392; G06F 3/0202; G06F 3/0362; H01H 19/001; H01H 19/005; H01H 13/52; H01H 2013/525; H04N 21/42226; G08C 2201/20; G08C 2201/21; G08C 2201/40; G08C 2201/93
See application file for complete search history.

(56) References Cited

U.S. PATENT DOCUMENTS

| 7,142,849 | B2 * | 11/2006 | Neuman | G07C 9/00182 455/420 |
| 9,390,618 | B2 * | 7/2016 | Ryu | H04L 12/2814 |
| 9,784,515 | B2 * | 10/2017 | Haimi | F41A 17/06 |
| 2010/0123834 | A1 * | 5/2010 | Brodersen | G08C 19/28 348/734 |
| 2013/0118418 | A1 * | 5/2013 | Lalor | A01K 15/021 119/720 |
| 2015/0268721 | A1 * | 9/2015 | Joo | G02B 27/0093 345/156 |
| 2016/0286760 | A1 * | 10/2016 | Manguette | A01K 15/021 |
| 2017/0113132 | A1 * | 4/2017 | Mortazavi | G06F 3/03549 |
| 2018/0225958 | A1 * | 8/2018 | Jensen | A63H 33/042 |
| 2018/0358195 | A1 * | 12/2018 | Deng | H01H 19/14 |

* cited by examiner

*Primary Examiner* — Franklin D Balseca
(74) *Attorney, Agent, or Firm* — FisherBroyles, LLP

(57) ABSTRACT

An apparatus may include a transmitter capable of sending a signal to a device that is configured with an action module that interprets the signal and a programming module, a dial that is adjustable to a plurality of positions, where position is matched by the programming module with a programmable action, and a button that is communicatively coupled to the transmitter and that, when pressed, triggers the transmitter to send to the device the signal indicating the current position of the dial, such that the action module activates a programmable action associated with the current position of the dial in response to the button being pressed. Various other apparatuses, systems, and methods are also disclosed.

20 Claims, 21 Drawing Sheets

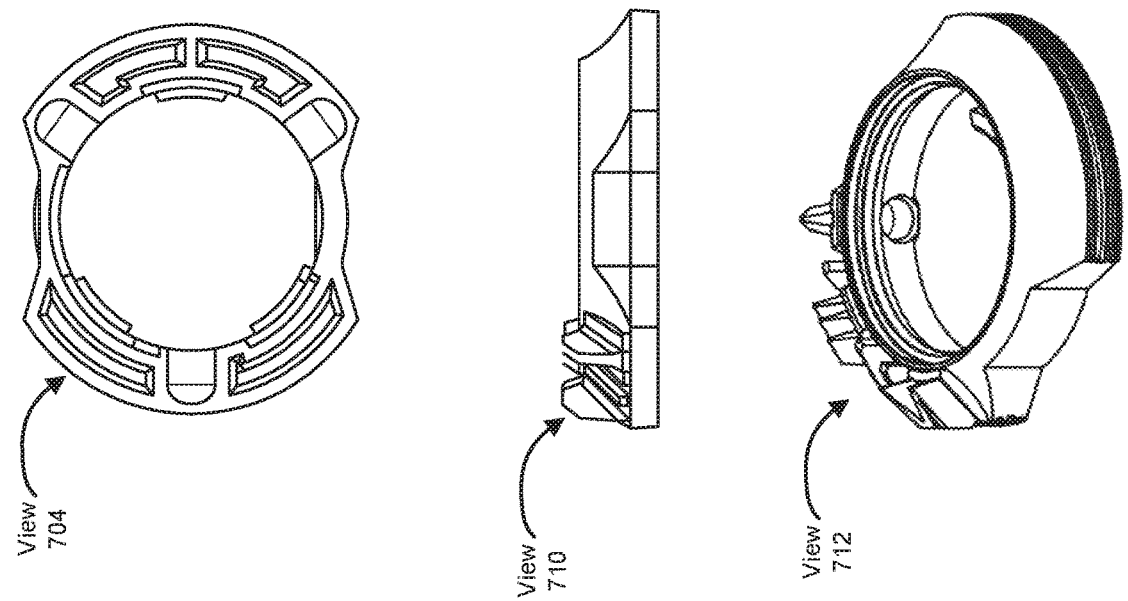
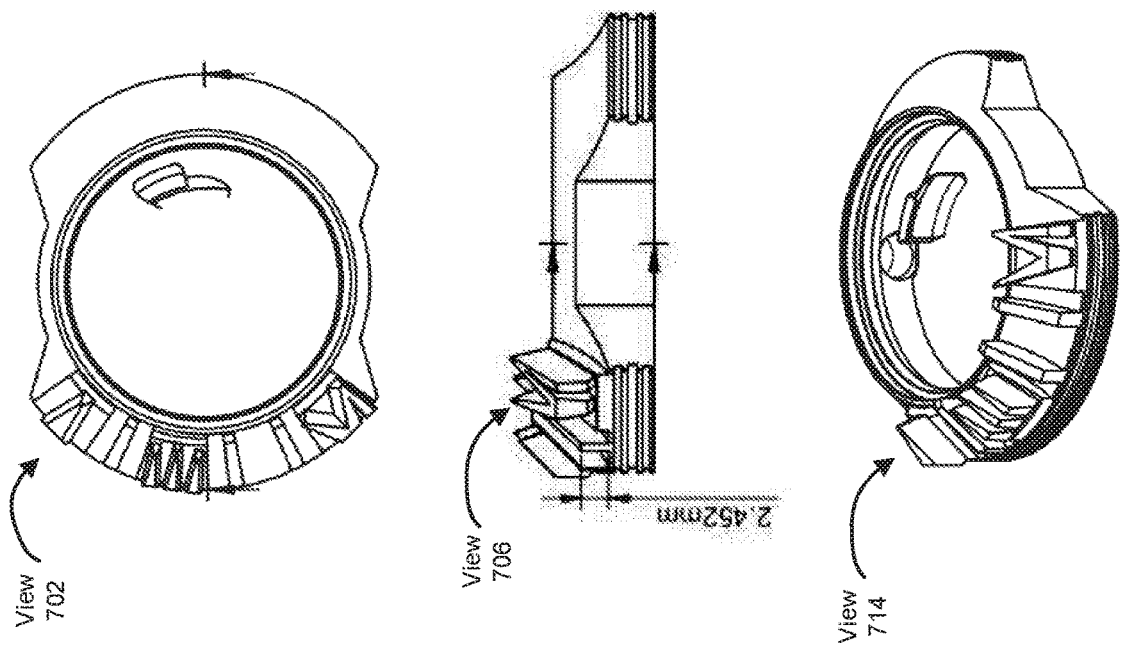
FIG. 7

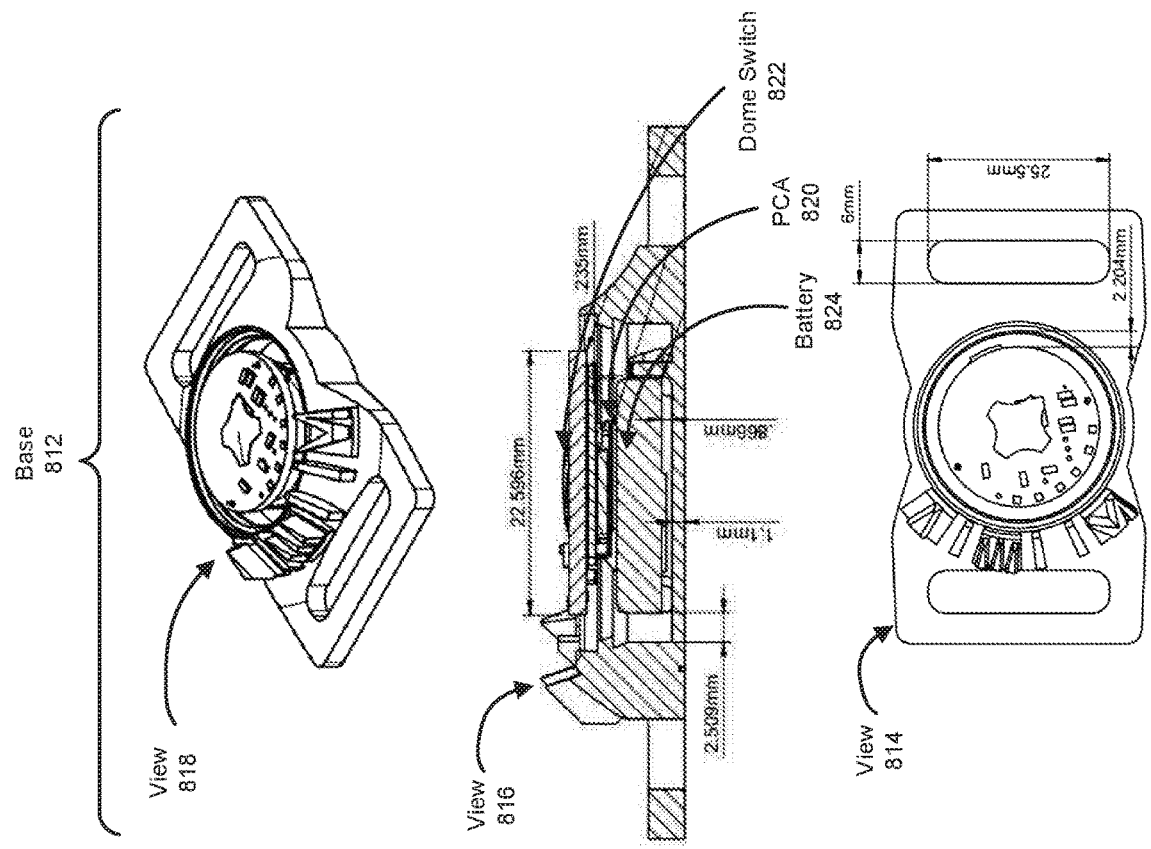
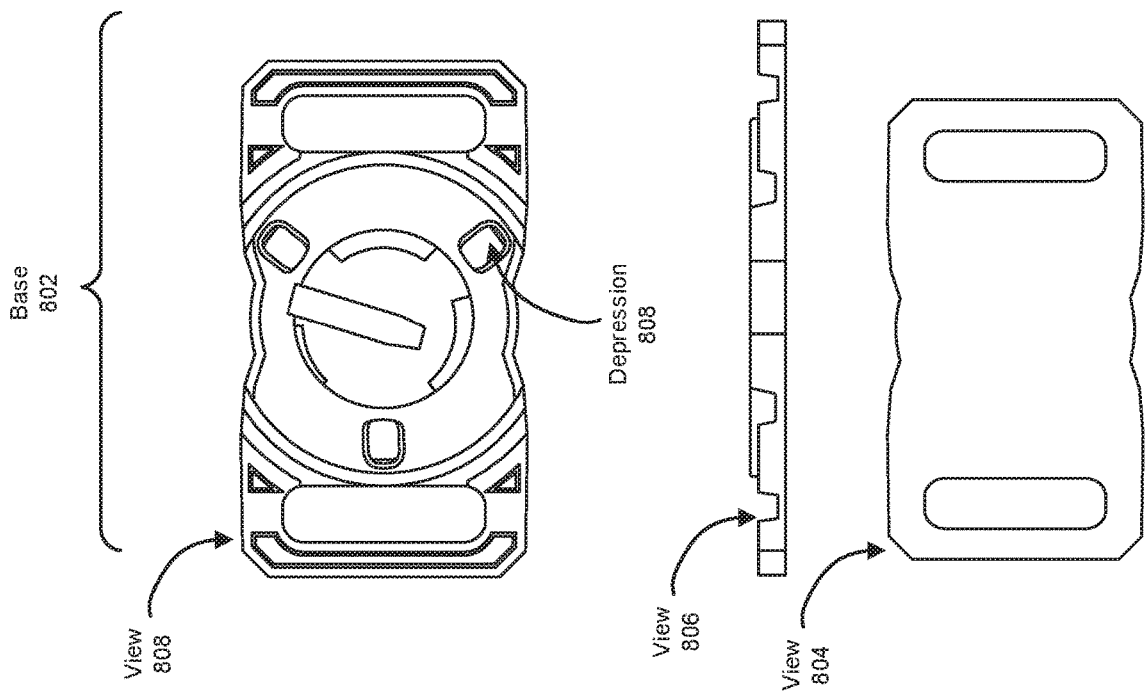
FIG. 8

US 10,795,466 B1

APPARATUSES, SYSTEMS, AND METHODS FOR CONFIGURING PROGRAMMABLE BUTTONS

GOVERNMENT LICENSE RIGHTS

This invention was made with Government support. The Government has certain rights in the invention.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is an illustration of an example chassis for a button assembly.

FIG. 8 is an illustration of two example bases for a button assembly.

Figure 1:
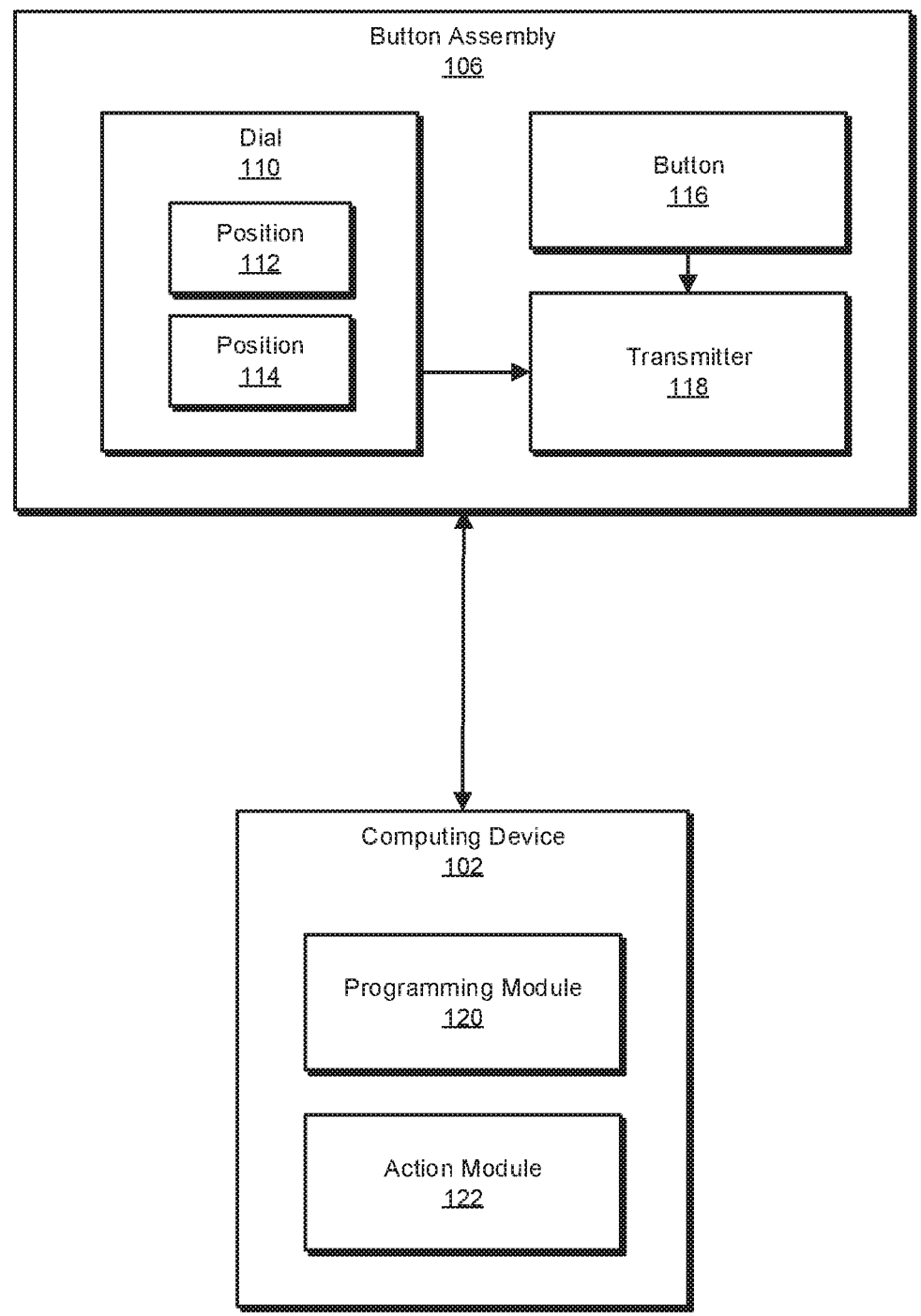
FIG. 1 is a block diagram of an example system for configuring programmable buttons.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses and systems for configuring programmable buttons. As will be explained in greater detail below, a programmable button may include a button, a dial that can be set to various positions, and a transmitter communicatively coupled to the button that sends signals that indicate the current position of the dial. For example, a button may be located in a cavity at the center of an annular dial that is coupled to a chassis assembly that can be attached to clothing, devices, and/or other items in a variety of ways to enable the button to be quickly and easily accessible to a user.

In some examples, the programmable button may be configured with a variety of different actions, enabling the user to control other devices, open communication channels, and/or perform other tasks with minimal disruption to other activities in which the user is engaged. In some embodiments, the dial and/or button may provide tactile feedback to the user, enabling the user to activate the button without looking at the button. By enabling the user to trigger custom programmable actions quickly and tactilely, the apparatuses described herein may enable users to quickly communicate with other devices and/or users in distracting and/or high-stress situations such as battlefields, emergency response situations, and extreme sports competitions. In some examples, the apparatuses described herein may enable users to interact with mobile devices while keeping the mobile devices safely stowed in pockets, containers, and/or packs in order to prevent damage to the mobile devices. As discussed in greater detail below, the various embodiments disclosed herein, whether used alone or in combination, may help users efficiently control and/or configure devices and/or perform other actions with minimal disruption to a user's other activities.

Figure 2:
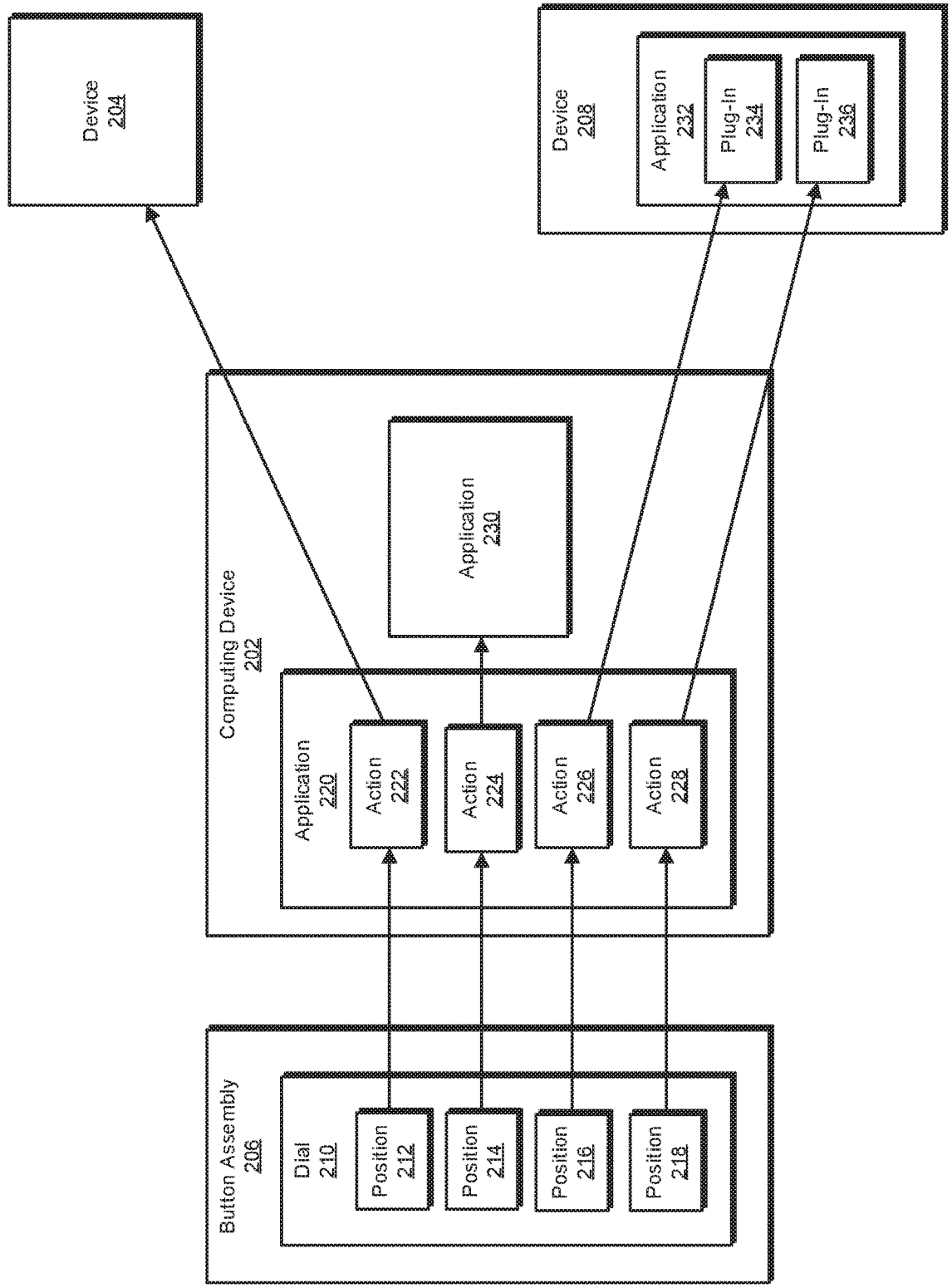
FIG. 2 is a block diagram of an additional example system for configuring programmable buttons.
Figure 3:
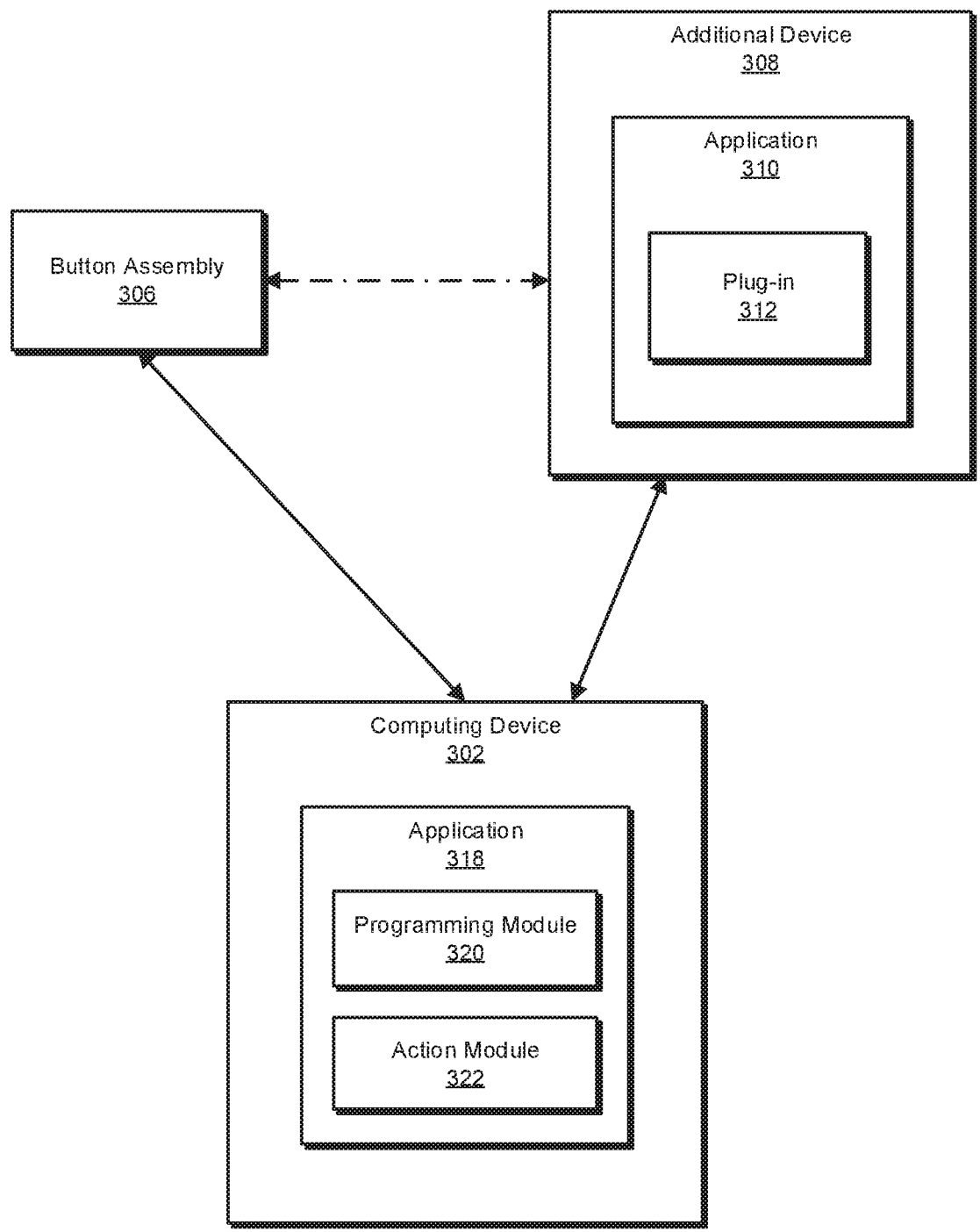
FIG. 3 is a block diagram of an additional example system for configuring programmable buttons.

The following will provide, with reference to FIGS. 1-3, example systems for configuring programmable buttons. In addition, the discussion associated with FIGS. 4-13 will provide examples of press pads, dials, dials coupled into assemblies, chasses, bases, metal bridges, contact springs, circuits, circuit assemblies, and PCB bridges, respectively. Furthermore, the discussion associated with FIGS. 14 and 15 will provide examples of button assemblies. Additionally, the discussion associated with FIGS. 16-20 will provide examples of button assemblies in use and/or in context. Finally, the discussion associated with FIG. 21 will provide examples of methods for configuring programmable buttons.

FIG. 1 is a system for configuring a programmable button assembly that communicates with an additional device. As illustrated in FIG. 1, a button assembly 106 may include a transmitter 118 capable of sending a signal to a computing device 102 that is configured with an action module 122 that interprets the signal and a programming module 120. In some embodiments, transmitter 118 may be capable of sending a wireless signal to computing device 102. Additionally or alternatively, transmitter 118 may send signals to action module 122 via a wired communication medium such as a cable. In some embodiments, button assembly 106 may include a dial 110 that is adjustable to a number of positions, such as position 112 and/or position 114, where each position is matched by programming module 120 with a programmable action. In some examples, dial 110 may have two positions, three positions, four positions, five positions, six positions, ten positions, and/or any other suitable number of positions. In some embodiments, button assembly 106 may include a button 116 that is communicatively coupled to transmitter 118 and that, when pressed, triggers transmitter 118 to send computing device 102 a signal indicating the current position of dial 110, such that action module 122 activates the programmable action associated with the current position of dial 110. In some examples, programming module 120 on computing device 102 may, in response to input from a user, associate a programmable action with a position of dial 110. In one example, action module 122 may perform the programmable action in response to receiving a signal from button assembly 106.

In some embodiments, programming module 120 may enable the user to associate a different programmable action for the same position for dial 110 with each different type of button press within a set of types of button press. For example, programming module 120 may enable a user to associate a first action with a normal press, a second action with a long press (e.g., a press where the button is depressed for a minimum amount of time, such as fifty milliseconds, one second, or two seconds), and/or a third action with a double press (e.g., two presses occurring within a minimum time of one another, such as fifty milliseconds, one second, or two seconds).

FIG. 2 is a system for configuring a programmable button assembly with various dial positions each associated with a different action. In some embodiments, button assembly 206 may include a dial 210 that has positions 212, 214, 216, and/or 218. In one embodiment, button assembly 206 may communicate with a computing device 202 configured with an application 220 that stores associations between dial positions and programmable actions. In one example, position 212 may be associated with an action 222, position 214 may be associated with an action 224, position 216 may be associated with an action 226, and/or position 218 may be associated with an action 228. In some examples, action 222 may include sending a signal to a device 204. For example, action 222 may include triggering the launch of a drone. In some examples, action 224 may include sending a signal to an application 230 on computing device 202. For example, action 224 may include launching an application on computing device 202, such as a recording application and/or a voice chat application. In some examples, action 224 may transmit an instruction to application 230 to perform an action, such as initiating a video recording and/or initiating communications with a predetermined user or set of users.

In one example, action 226 may include sending a signal to a plug-in 234 to an application 232 on a device 208 and/or action 228 may include sending a signal to a plug-in 236 to application 232 on device 208. For example, action 226 may update a user interface of application 232 with additional information and/or action 228 may trigger application 232 to send a signal to other instances of application 232 on other devices. In one example, action 226 may update a wearable heads-up-display with information about the user's current position and/or weapons status while action 228 may send that information to a preselected list of other users of similar heads-up-displays.

FIG. 3 is a system for configuring a programmable button assembly that communicates with another device. In one example, a button assembly 306 may communicate with a computing device 302 and/or an additional device 308. Button assembly 306, computing device 302, and/or additional device 308 may communicate in a variety of ways. In one embodiment, button assembly 306 may communicate directly with additional device 308. Additionally or alternatively, button assembly 306 may communicate with computing device 302 which may then relay signals to additional device 308. For example, computing device 302 may be a mobile device such as a smart phone or tablet that is paired with button assembly 306 via a wireless communication medium. In other embodiments, computing device 302 may be paired with button assembly via a wired communication medium. In one example, button assembly 306 may send signals to an application 318 on computing device 302 that includes a programming module 320 and/or an action module 322. In some examples, application 318 may send signals to an application 310 on additional device 308. In one embodiment, application 318 may communicate with application 310 via a plug-in 312 in application 310 that enables application 310 to receive signals from application 318. Additionally or alternatively, application 318 may be configured with a plug-in that enables application 318 to communicate with application 310. In some embodiments, application 310 may be configured with one or more plug-ins that provide additional functionality to application 310 and/or that perform additional functionality in response to signals from application 318.

Figure 4:
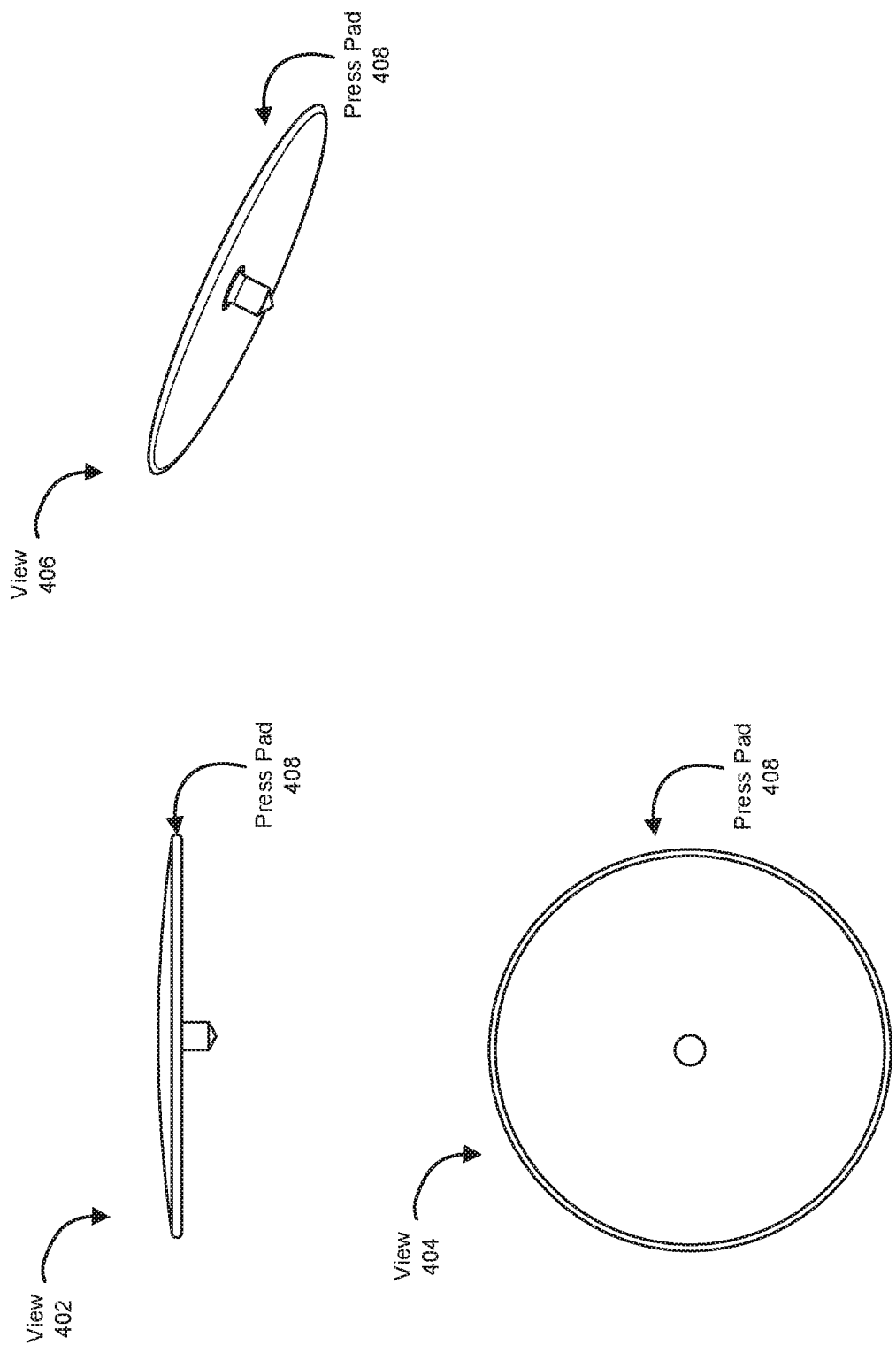
FIG. 4 is an illustration of an example press pad.

FIG. 4 is an illustration of an example press pad. In one embodiment, as shown in view 402, a press pad 408 may be circular in shape and/or may be convex in shape. In other embodiments, a press pad may be square in shape, irregular in shape, hexagonal in shape, and/or any other suitable shape. In some embodiments, press pad 408 may include a protrusion that contacts other components (such as a dome switch) when press pad 408 is depressed. In some embodiments, as shown in view 404, the protrusion may be located in the center of press pad 408. View 406 shows an isometric view of press pad 408. In one embodiment, press pad 408 may be part of a button and/or button assembly. In some examples, press pad 408 may provide tactile feedback to a user when pressed. In one example, press pad 408 may provide sufficient tactile feedback for a user to feel a successful press through gloves.

Figure 5:
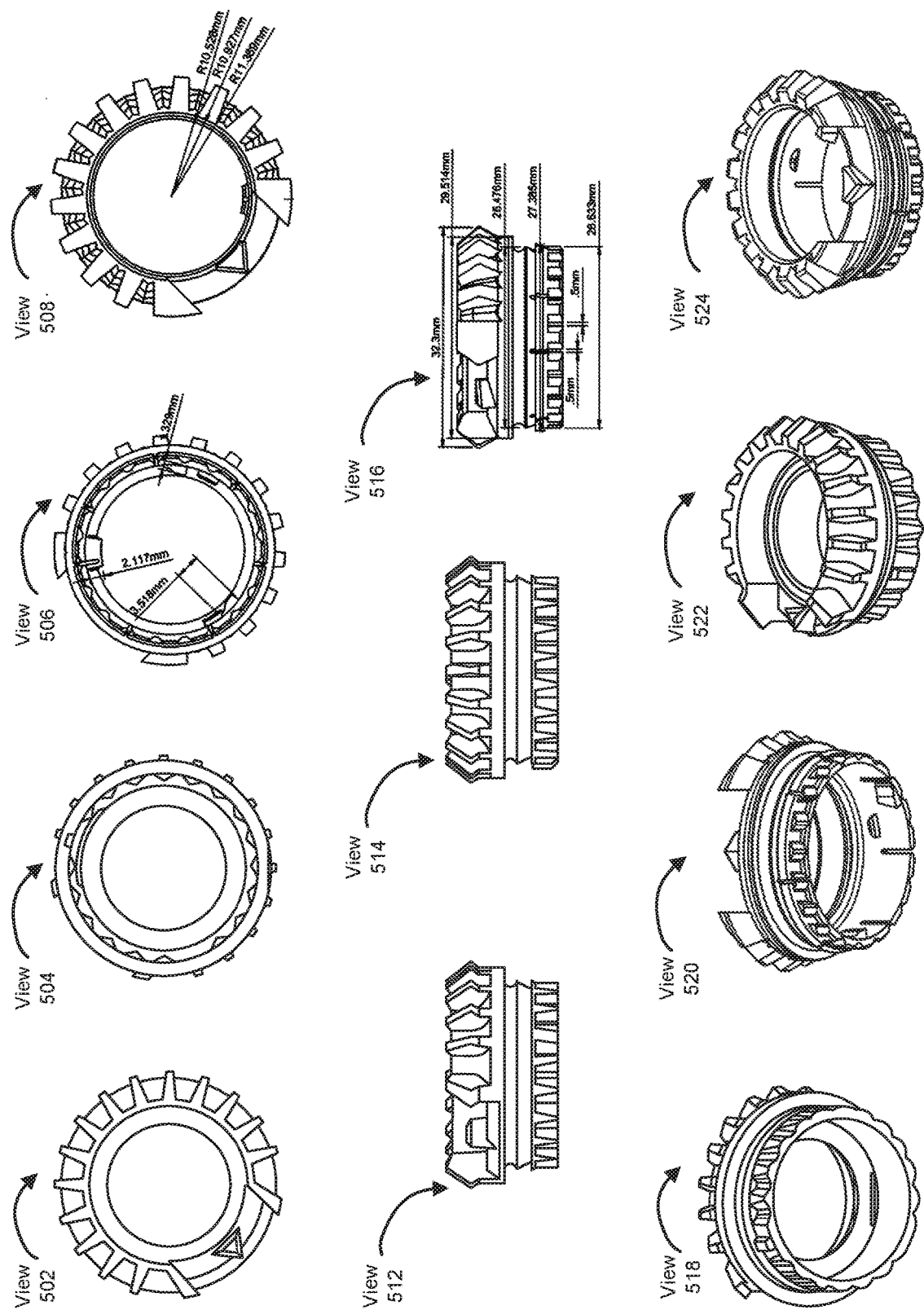
FIG. 5 is an illustration of an example dial.

FIG. 5 is an illustration of an example dial. Views 502, 504, 506, and 508, show a top-down view of a rotary dial and describe various dimensions of the dial. Views 512, 514, and 516 show a side view of a rotary dial and describe various dimensions of the dial. Views 518 and 520 show an isometric view of a rotary dial from below and to the side. Views 522 and 524 show an isometric view of a rotary dial from above and to the side. As illustrated in views 520, 522, and 524, a rotary dial may have a tactile symbol that shows the current position of the dial. In some examples, the tactile symbol may enable a user to feel the current position of the dial without looking at the dial. In some embodiments, a rotary dial may have a textured grip that enables a user to easily grip and rotate the rotary dial, even in adverse environment conditions (e.g., when the dial is wet due to rain) and/or while wearing gloves.

Figure 6:
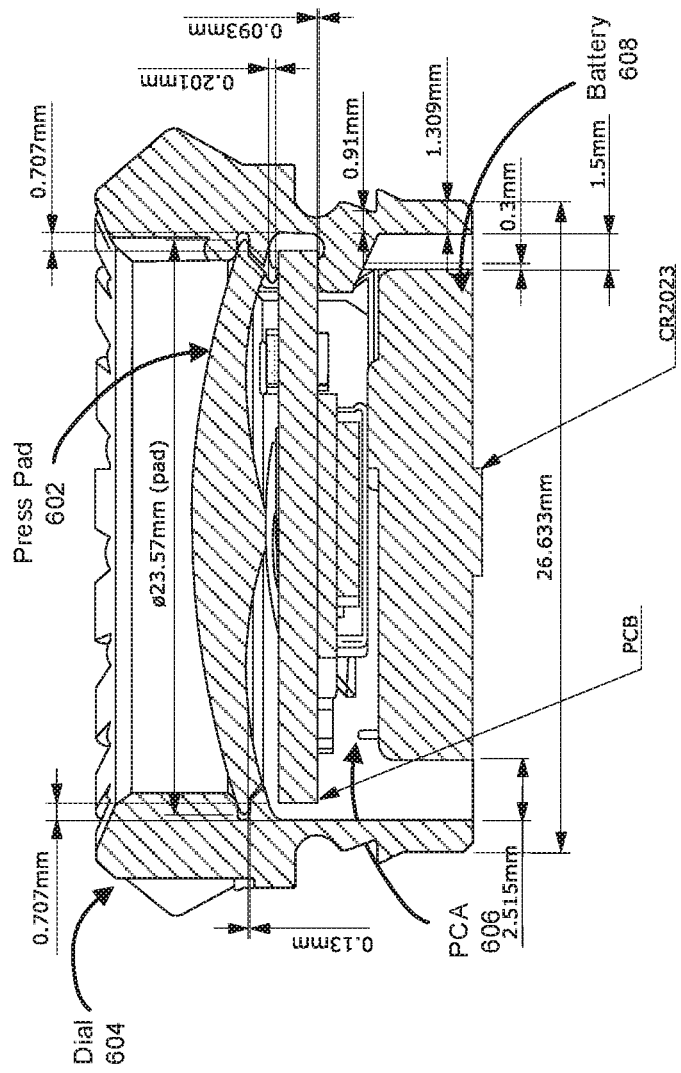
FIG. 6 is an illustration of an example dial coupled to a press pad and printed circuit assembly (PCA).

FIG. 6 is an illustration of an example dial coupled to a press pad and PCA. As illustrated in FIG. 6, a press pad 602 may be coupled to a dial 604 that houses a PCA 608. In some embodiments, press pad 602 may be non-removably coupled to dial 604. For example, press pad 602 may be sonic welded to dial 604. In one embodiment, dial 604 may be annular and press pad 602 may be located within a cavity defined by dial 604. In one embodiment, the outer face of press pad 602 may be within the cavity defined by dial 604 such that press pad 602 defines the base of the cavity.

FIG. 7 is an illustration of an example chassis for a rotary dial within a button assembly. View 702 shows a top-down view of a chassis. View 704 shows a bottom-up view of a chassis. Views 706 and 710 show side views of a chassis. Views 712 and 714 show isometric views of a chassis from different rotational angles. As shown prominently in views 702 and 714, a chassis for a rotary dial may have different tactile symbols at different dial positions. In some embodiments, chassis for a rotary dial may have textured symbols, inset symbols, raised symbols, engraved symbols, and/or embossed symbols. In one embodiment, chassis for a rotary dial may have raised Roman numerals at different dial positions. In some embodiments, chassis for a rotary dial may have a symbol at each dial position. In other embodiments, chassis for a rotary dial may have symbols only at some positions. For example, even-numbered positions may have symbols while odd-numbers positions may not have symbols, or vice versa. In one embodiment, the walls of the chassis surrounding the rotary dial may be a different thickness at different positions to enable users to distinguish between positions in an additional way. In some embodiments, positions may be evenly spaced around the entire circumference of a rotary dial and/or chassis, while in other embodiments, positions may be clustered on one section and/or otherwise unevenly distributed. For example, positions may be clustered in one quarter of the dial. In some examples, a dial may only rotate through the marked positions. For example, if positions are clustered in one quarter of a dial, the dial may only rotate ninety degrees.

FIG. 8 is an illustration of two example bases for a button assembly. View 804 is a bottom view of an example base 802 that connects to a separate chassis. View 806 is a side view of base 804. View 808 is a top-down view of base 802 that shows depression 808 for collared plungers that connect base 802 to a chassis. View 814 is a top-down view of an example base 812 that has an integrated chassis with tactile symbols that show dial positions. View 816 is a cutaway side view of base 812 that shows a PCA 820, a dome switch 822, and a battery 824 housed within base 812. View 818 is an isometric view of base 812.

Figure 9:
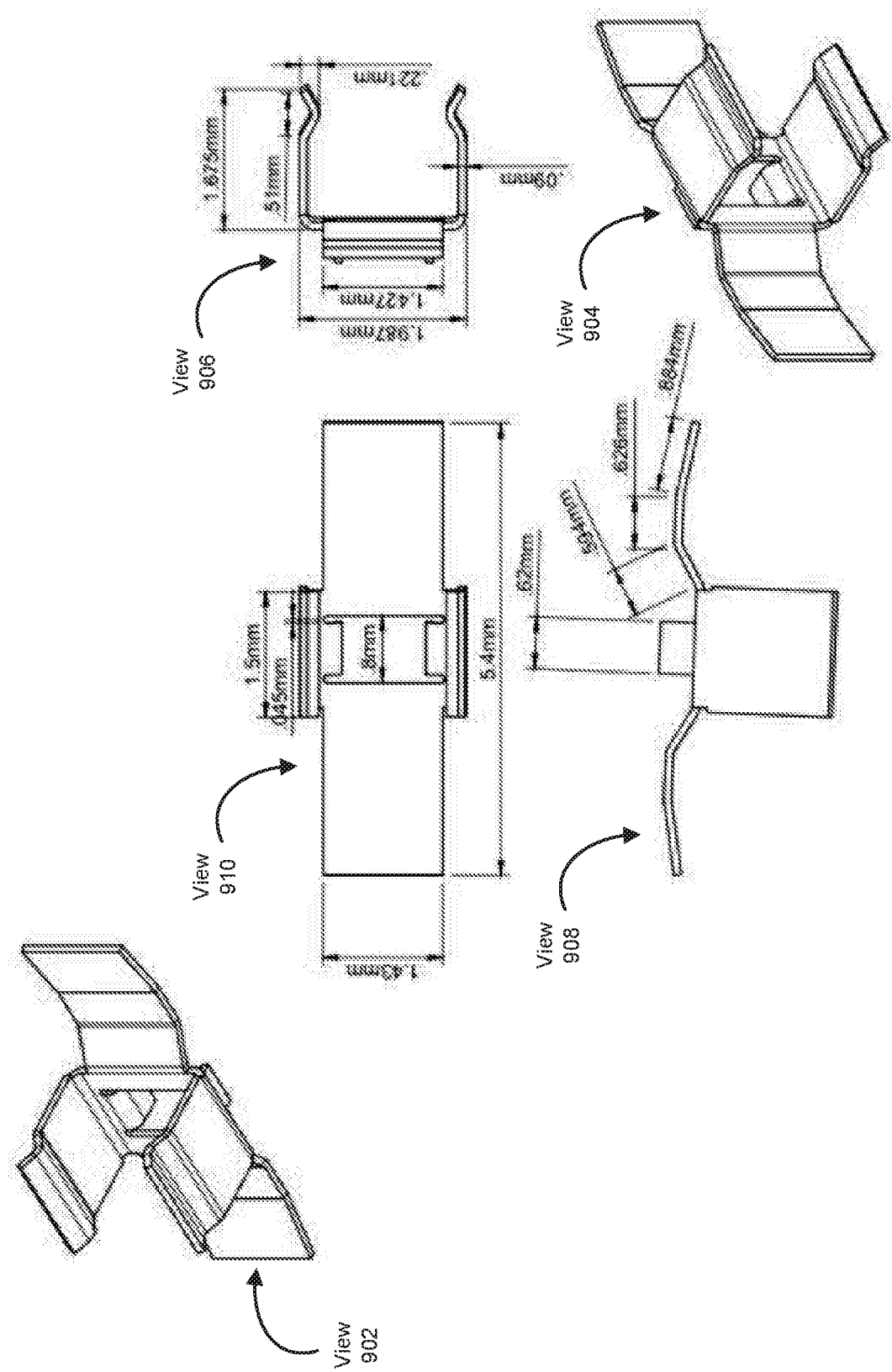
FIG. 9 is an illustration of an example metal bridge for a button assembly.
Figure 13:
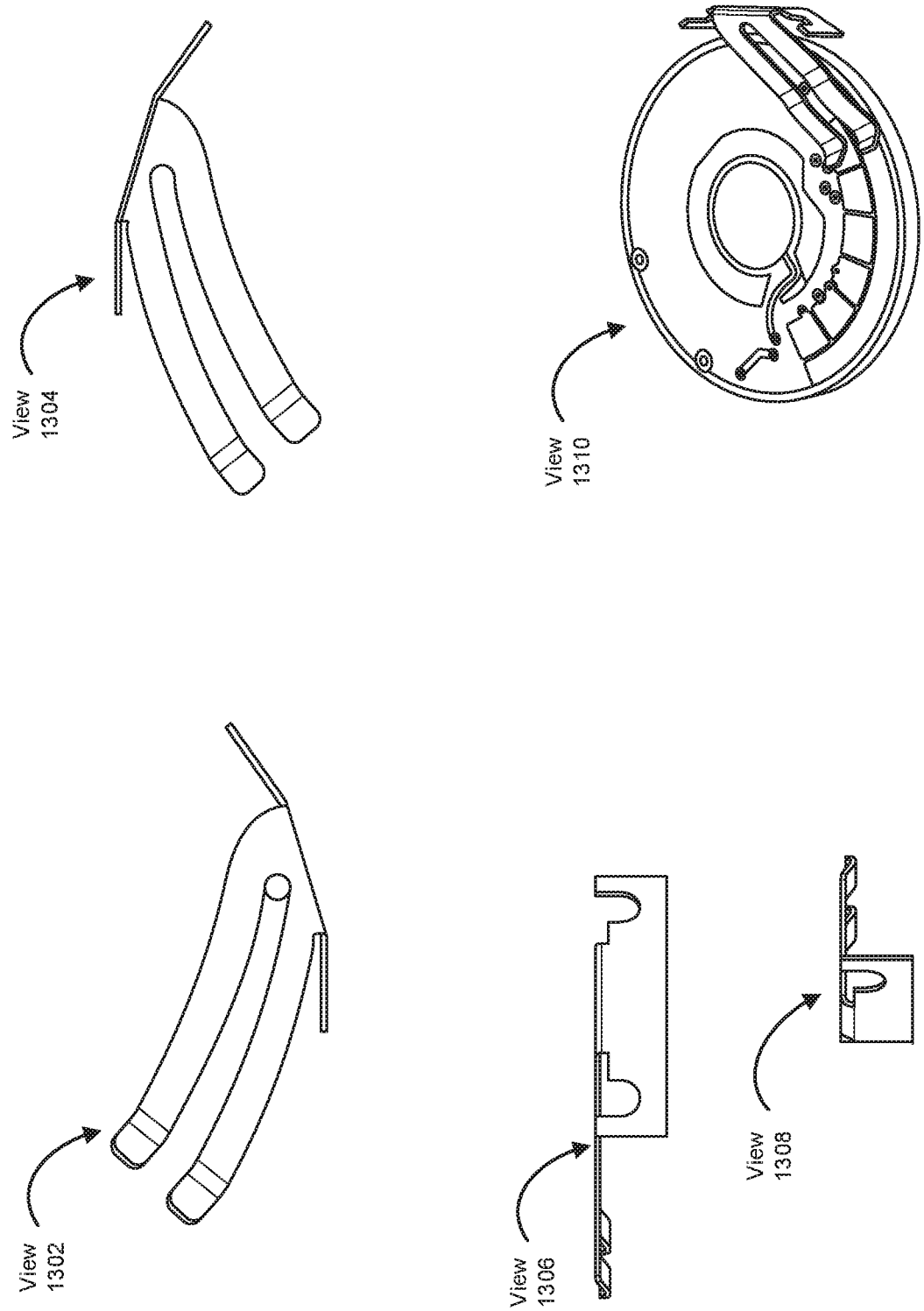
FIG. 13 is an illustration of an example printed circuit board (PCB) bridge.

FIG. 9 is an illustration of an example metal bridge for a button assembly. Views 902 and 904 show different angles of an isometric view of a metal bridge. View 906 shows a side view of a metal bridge. View 908 shows a top-down view of a metal bridge. View 910 shows a front view of a metal bridge. In some embodiments, a metal bridge such as the metal bridge illustrated in FIG. 9 may function as a PCB bridge. In other embodiments, a PCB bridge may have curves rather than sharp angles, as illustrated in FIG. 13, described below.

Figure 10:
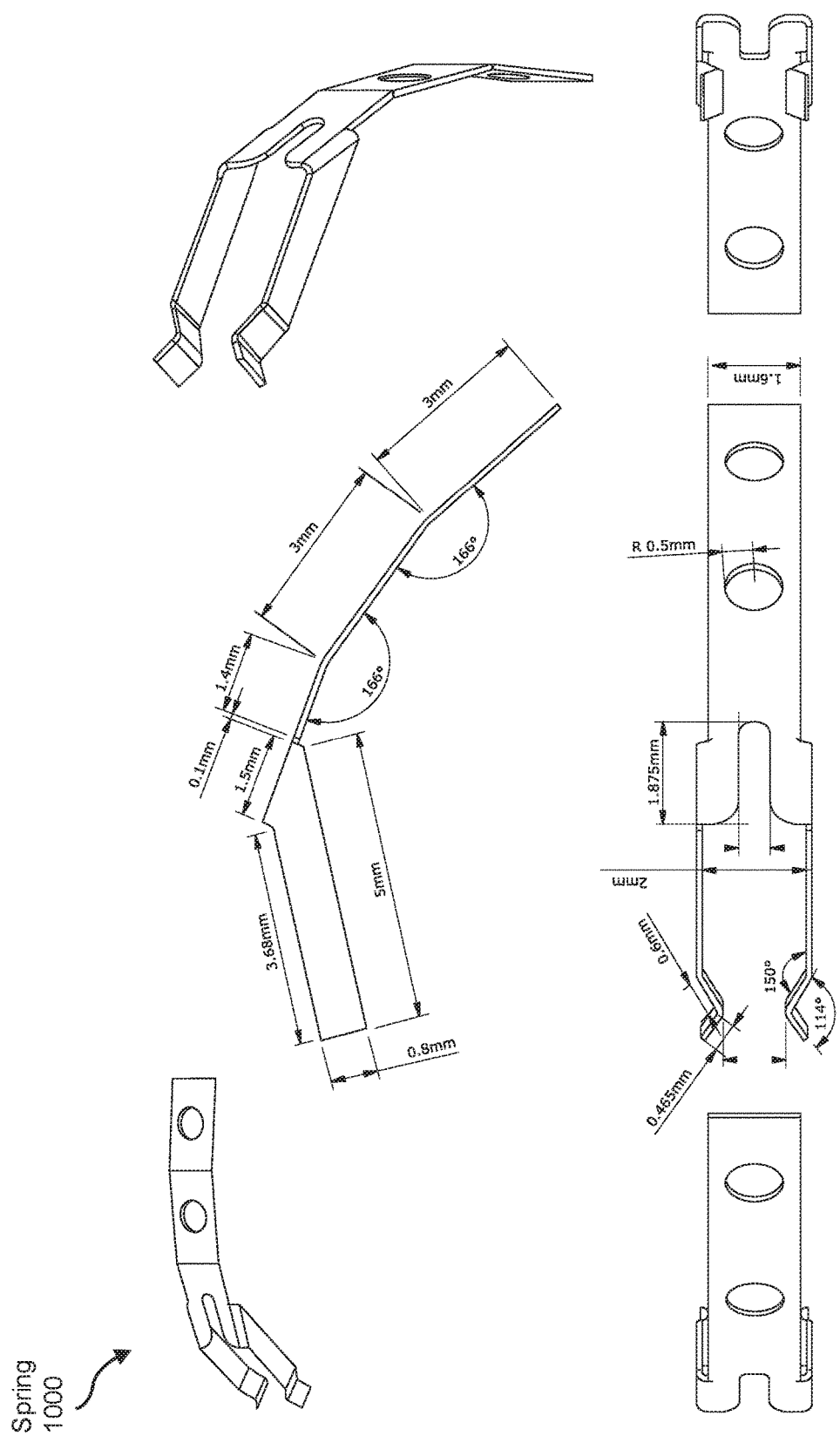
FIG. 10 is an illustration of an example contact spring for a button assembly.

FIG. 10 is an illustration of various views of contact spring 1000 for a button assembly. In some embodiments, a contact spring may lie along the edge of a circular PCA or PCB, bridging contacts on the top and bottom. In one embodiment, a contact spring may be part of and/or function as a PCB bridge.

Figure 11:
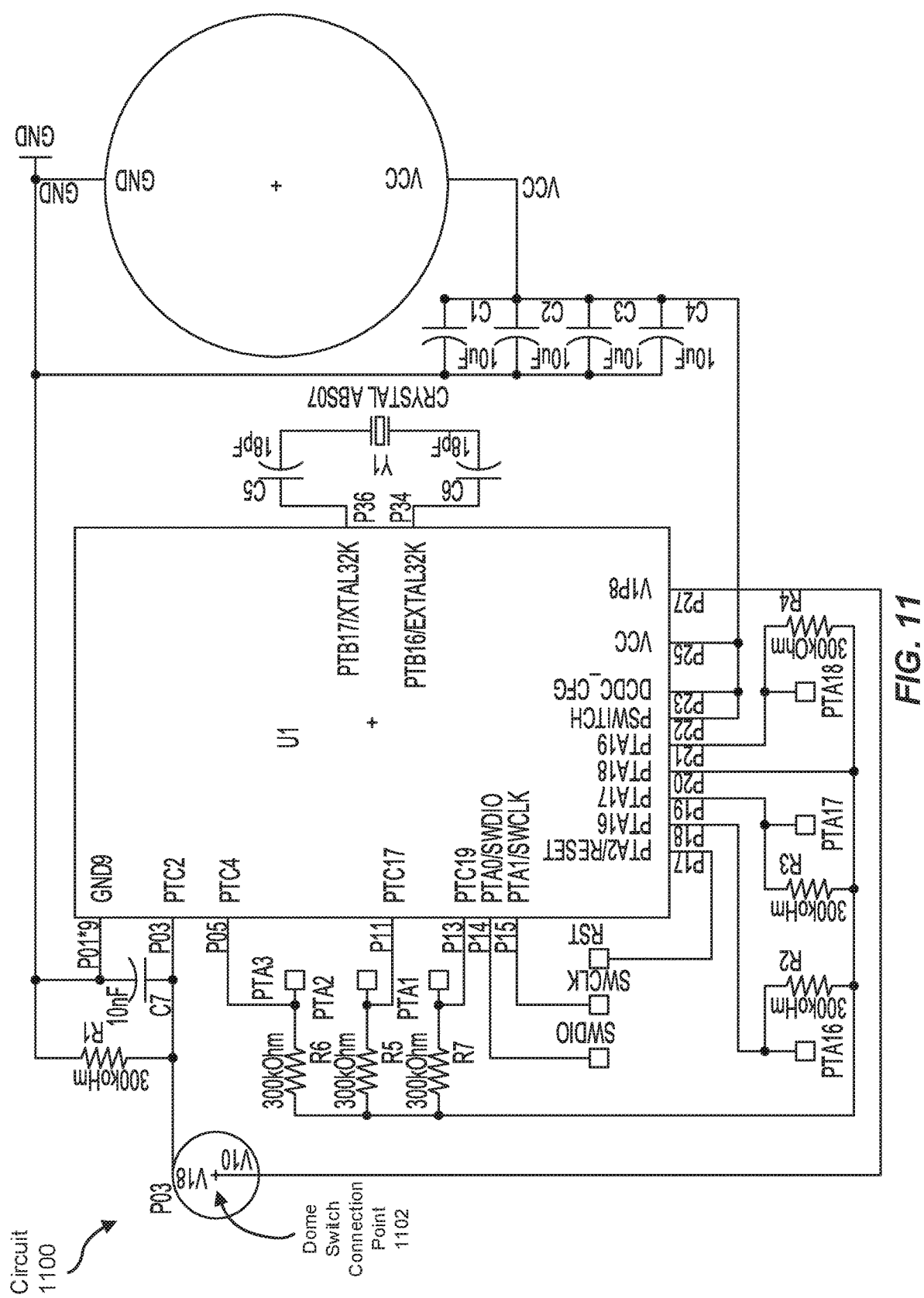
FIG. 11 is an illustration of an example circuit.

FIG. 11 is an illustration of an example circuit 1100. In some embodiments, circuit 1100 may be part of a PCB and/or PCA that is part of a button assembly. In one embodiment, a dome switch may contact circuit 1100 at a dome switch connection point 1102.

Figure 12:
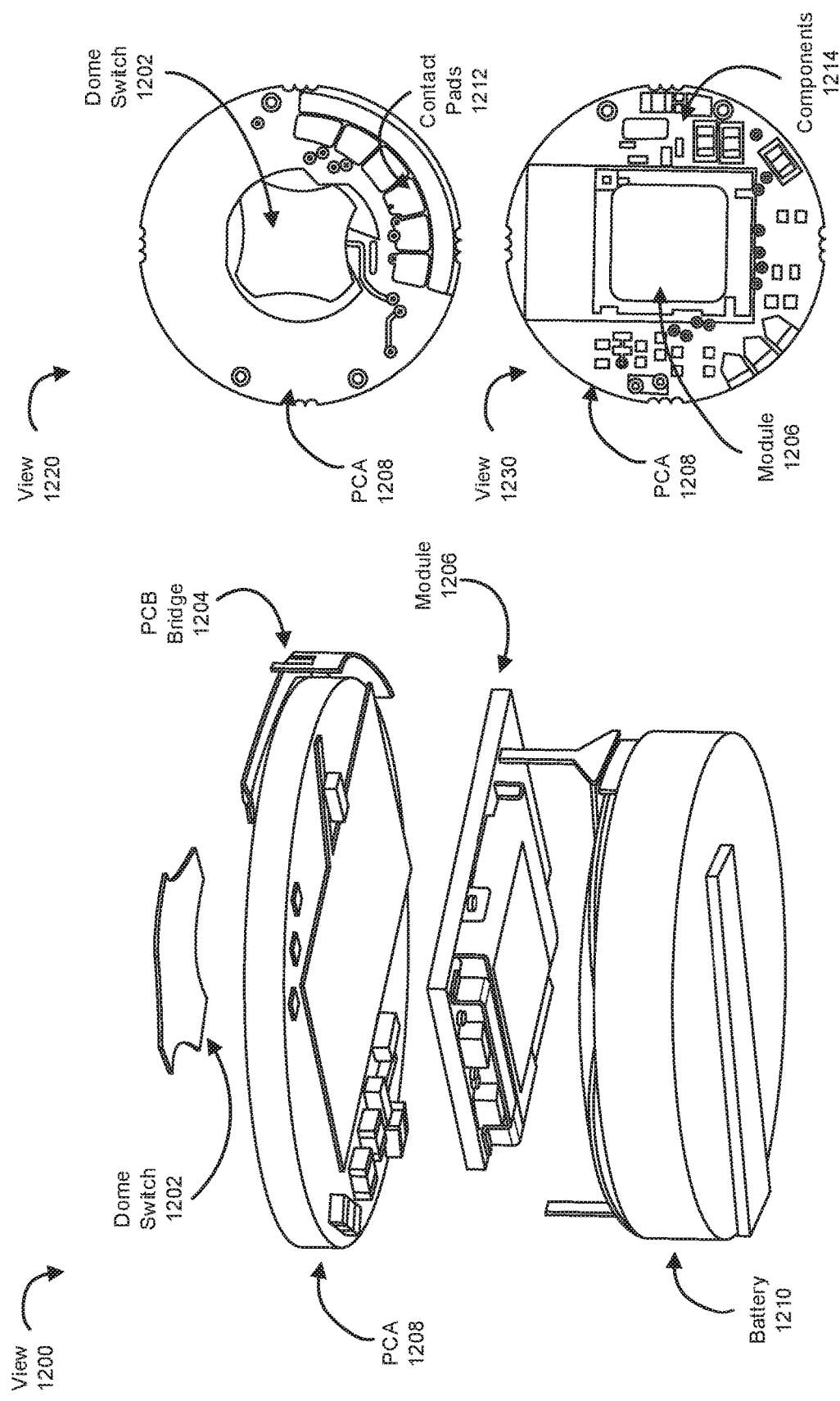
FIG. 12 is an illustration of an example circuit assembly.

FIG. 12 is an illustration of an example circuit assembly for a button assembly. As illustrated in FIG. 12 in view 1200, a dome switch 1202 may be coupled to a PCA 1208. In some embodiments, PCA 1208 may be coupled to a module 1206 that includes various embedded and/or integrated systems (described in greater detail in reference to FIG. 15, below). In some embodiments, PCA 1208 may also be coupled to a PCB bridge 1204 and or a battery 1210, such as a coin cell battery. As shown in view 1220, dome switch 1202 may be coupled to the center of the top surface of PCA 1208. In some embodiments, PCA 1208 may include a set of contact pads 1212 for contact with PCB bridge 1204. As shown in view 1230, module 1206 may be coupled to the center of the bottom surface of PCA 1208. In some embodiments, components 1214 may be soldered to PCA 1208 on one side to improve ease of assembly.

FIG. 13 is an illustration of an example PCB bridge for a button assembly. Views 1302 and 1304 show an example PCB bridge from different isometric angles. Views 1306 and 1308 show side views of a PCB bridge. View 1310 shows a PCB bridge in contact with a PCA. In some embodiments, a PCB bridge may be coupled to a rotary dial such that turning the rotary dial to different positions causes the PCB bridge to contact different contact pads on a PCA.

Figure 14:
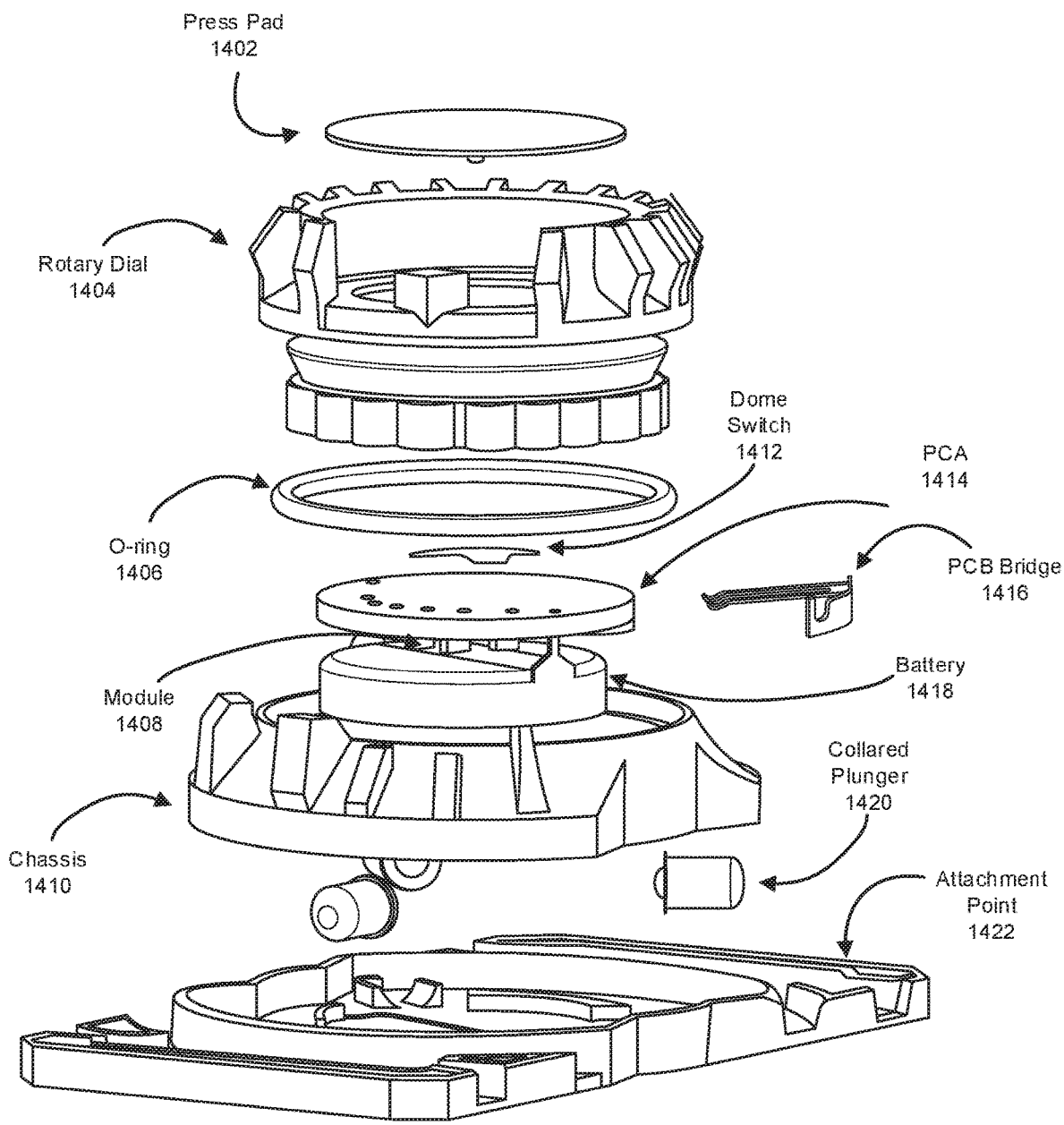
FIG. 14 is an illustration of an example button assembly.

FIG. 14 is an illustration of an example disassembled button assembly. As illustrated in FIG. 14, in some embodiments, a button assembly 1400 may include a press pad 1402 (such as press pad 408 in FIG. 4), a rotary dial 1404 (such as the rotary dial illustrated in FIGS. 5 and 6), an O-ring 1406, a module 1408 that includes various embedded systems (such as the module 1206 in FIG. 12), a chassis 1410 (such as the chassis illustrated in FIG. 7), a dome switch 1412, a PCA 1414 (such as circuit 1100 in FIG. 11), a PCB bridge 1416 (such as the PCB bridge illustrated in FIG. 13 and/or the bridge illustrated in FIG. 9), a battery 1418, one or more collared plungers 1420, and/or an attachment point 1422. In some examples, attachment point 1422 may be designed to attach to a strap.

Figure 15:
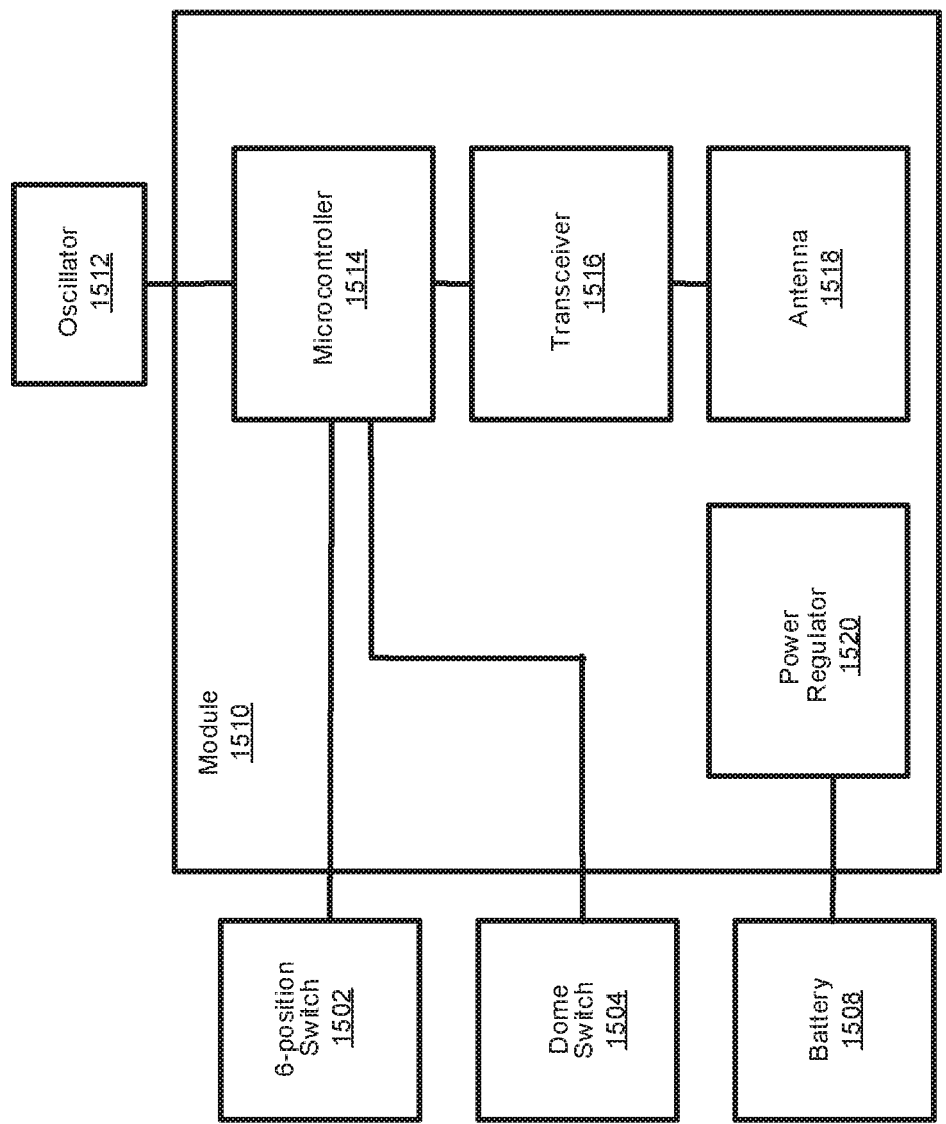
FIG. 15 is a block diagram of an example button assembly.

FIG. 15 is a block diagram of an example button assembly. In some embodiments, a button assembly may include a module 1510 that contains various elements. In one example, module 1510 may be a low-power single-chip device that includes embedded systems such as a microcontroller 1514, a transceiver 1516, and antenna 1518, and/or a power regulator 1520. In some embodiments, antenna 1518 may be an integrated antenna. In one embodiment, microcontroller 1514 may be communicatively coupled to a 6-position switch 1502, a dome switch 1504, an oscillator 1512, and/or transceiver 1516. In some embodiments, 6-position switch 1502 may be coupled to a dial and/or dome switch 1504 may be coupled to a button. In one embodiment, transceiver 1516 may be communicatively coupled to antenna 1518 and/or microcontroller 1514. In some embodiments, power regulator 1520 may regulate a battery 1508.

Figure 16:
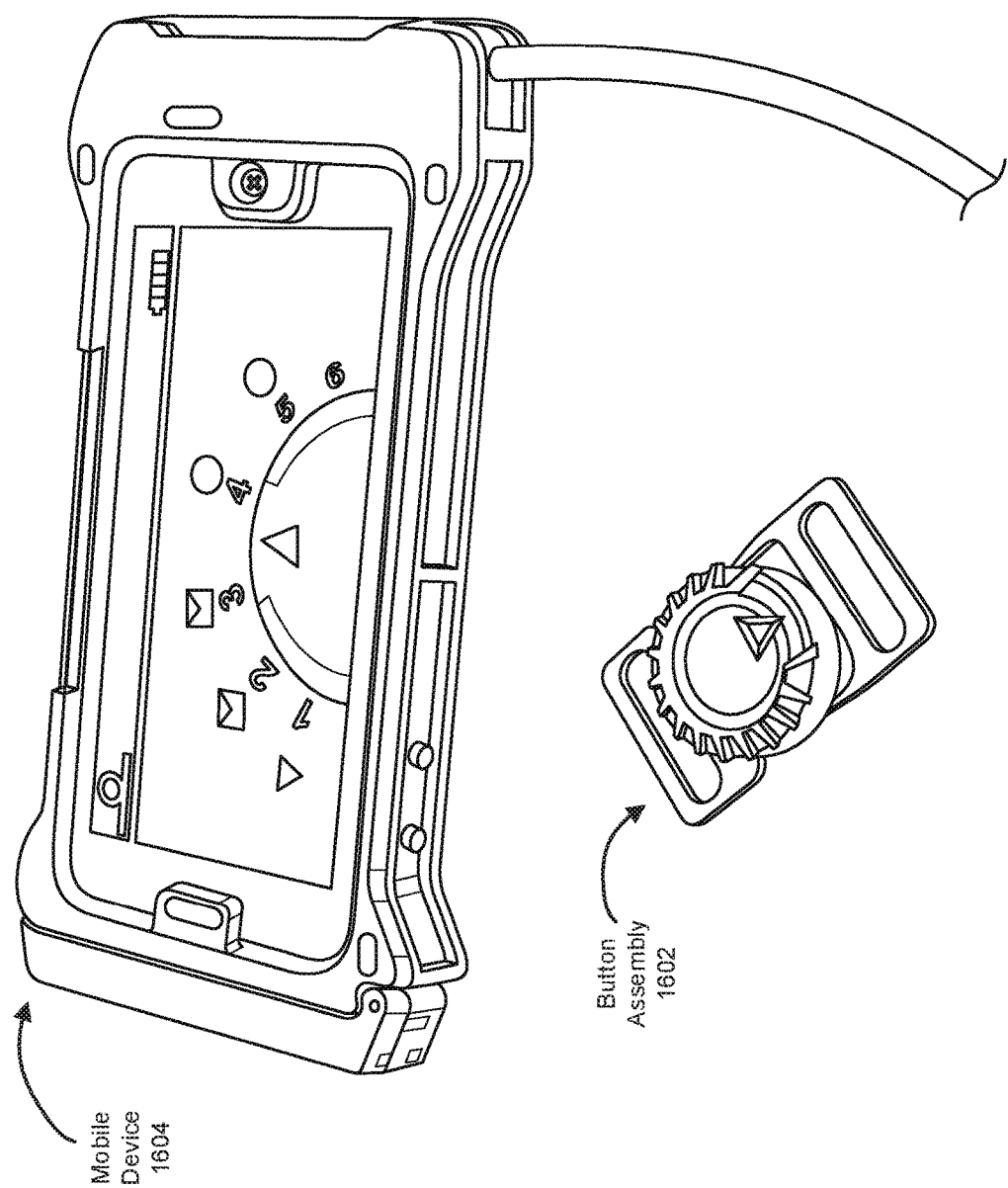
FIG. 16 is an illustration of an example button assembly and mobile device.

FIG. 16 is an illustration of an example button assembly and mobile device. As illustrated in FIG. 16, a button assembly 1602 may pair with a mobile phone 1604 that may be used to associate actions with dial positions and/or button press types. In some examples, mobile phone 1604 may receive signals from button assembly 1602 and/or relay signals from button assembly 1602 to other devices.

Figure 17:
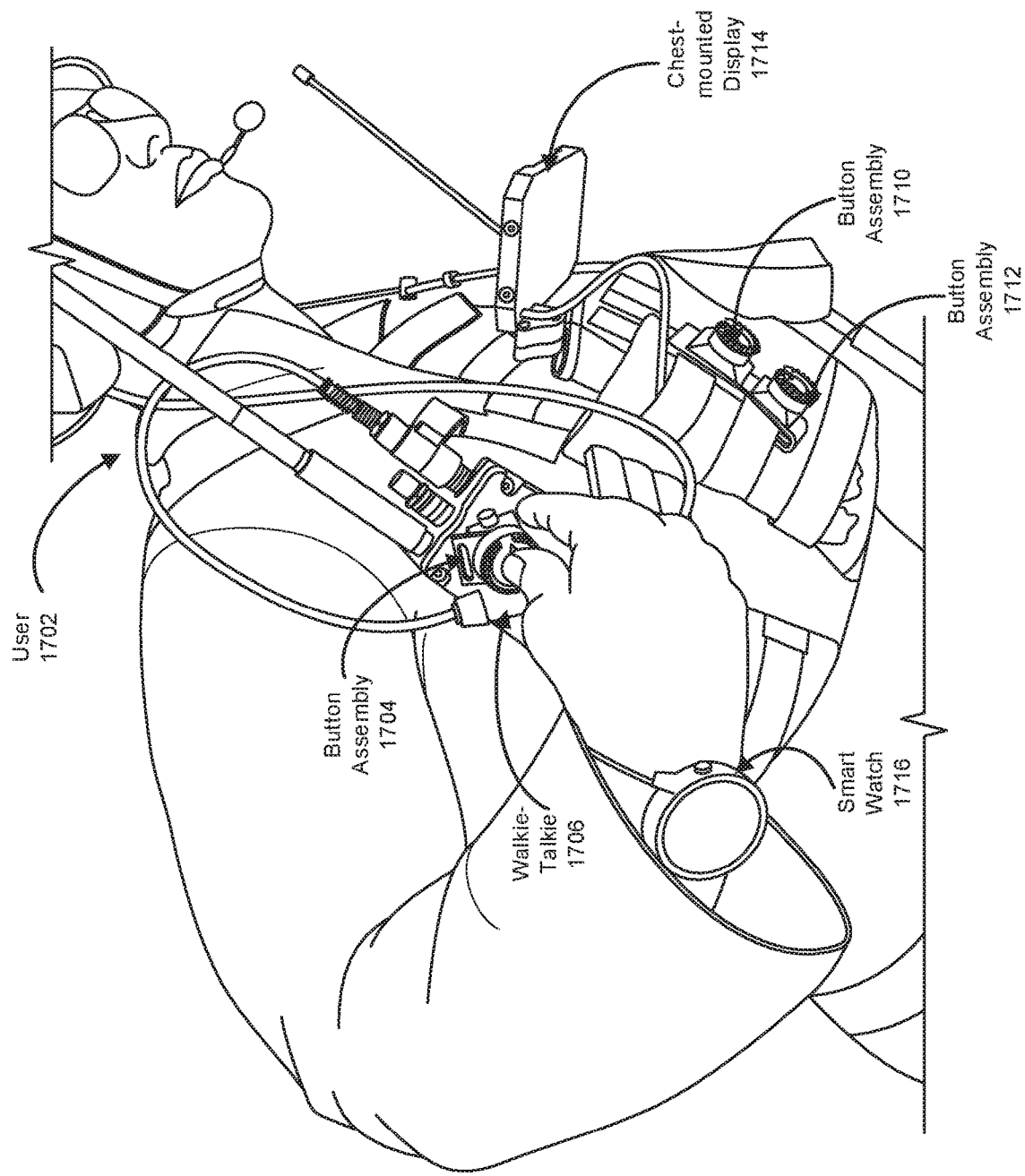
FIG. 17 is an illustration of an example button assembly in use.

FIG. 17 is an illustration of an example button assembly in use. As illustrated in FIG. 17, a user 1702 may wear multiple button assemblies that are attached in various ways. In one example, a button assembly 1704 may be attached to a walkie-talkie 1706 via a rubber band. Additionally or alternatively, button assembly 1704 may be attached to walkie-talkie via paracord, adhesive backing, a carabiner, and/or a clip. In some examples, button assemblies 1710 and/or 1712 may be attached to clothing and/or body armor via modular lightweight load carrying equipment straps. Button assemblies 1704, 1710, and/or 1712 may communicate with various other devices, such as walkie-talkie 1706, chest-mounted-display 1714, and/or smart watch 1716.

Figure 18:
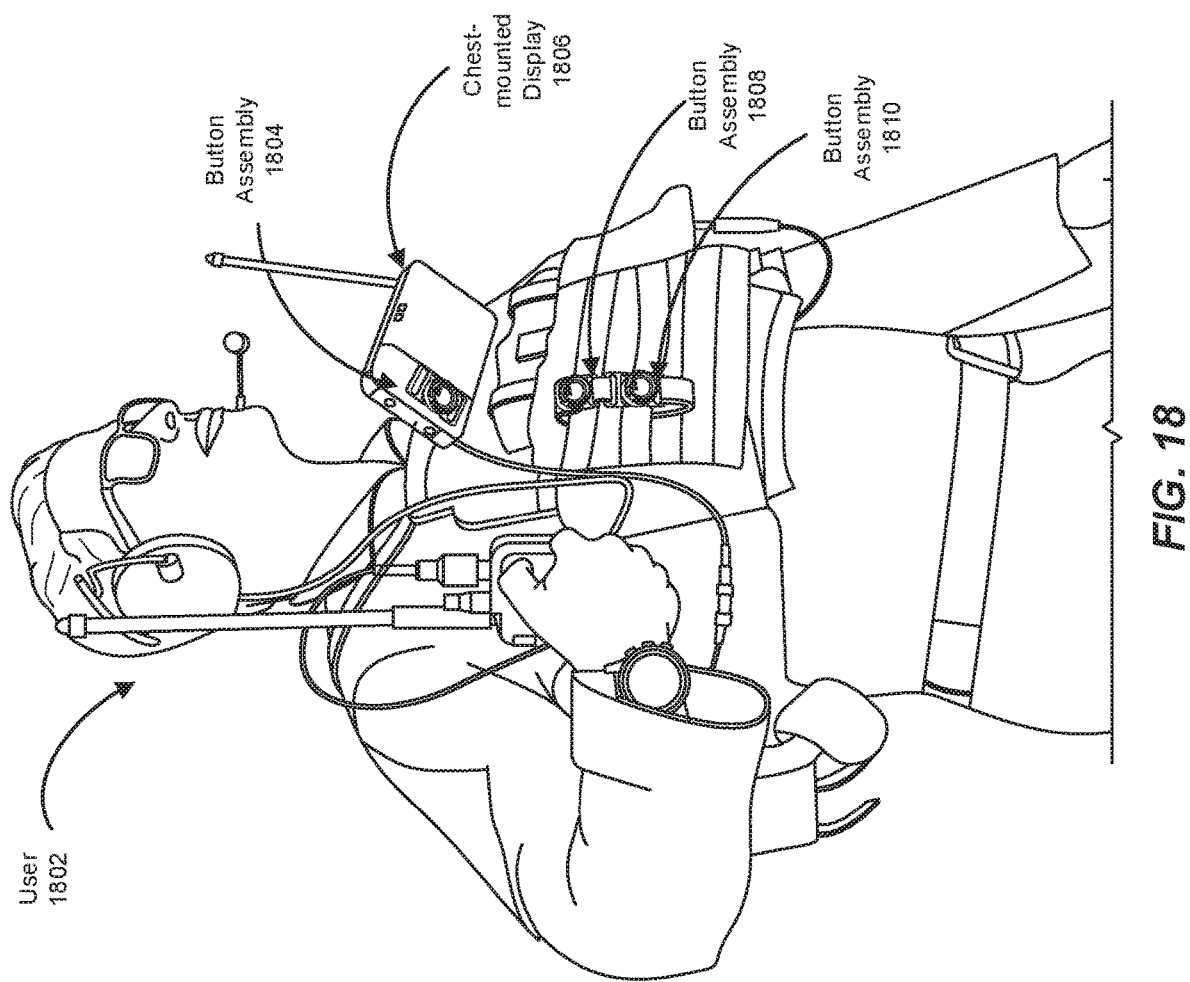
FIG. 18 is an illustration of an additional example button assembly in use.

FIG. 18 is an illustration of an additional example button assembly in use. As illustrated in FIG. 18, a user 1802 may attach a button assembly 1804 to a chest-mounted display 1806. In some examples, user 1802 may also attach button assemblies 1808 and/or 1810 to clothing and/or body armor via straps. In some examples, each of button assembly 1804, 1808, and/or 1910 may be programmed with different actions, enabling user 1802 to perform fifty-four different actions (three button assemblies with each six dial positions with three possible button press types) quickly and efficiently via positioning dials and pressing buttons.

Figure 19:
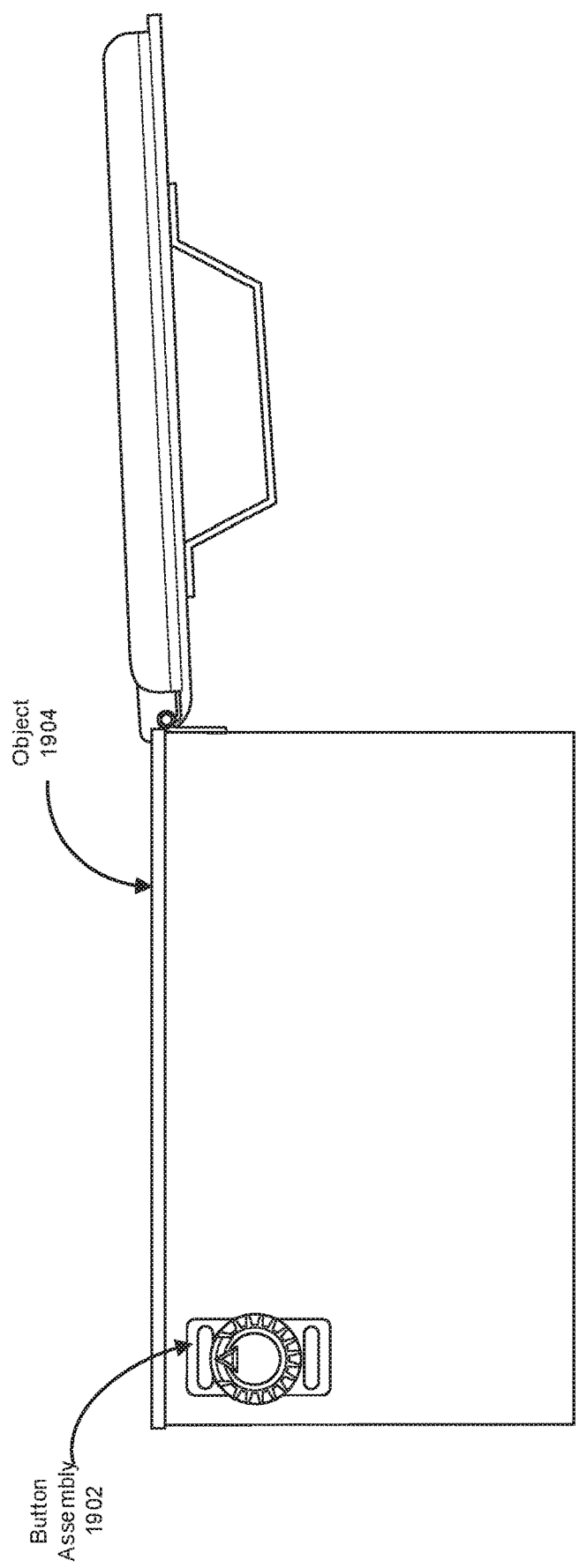
FIG. 19 is an illustration of an additional example button assembly in use.

FIG. 19 is an illustration of an example button assembly in use. As illustrated in FIG. 19, in some examples, a button assembly 1902 may be attached via an adhesive backing to an object 1904. In some examples, object 1904 may be a mobile object, such as an ammunition box. In other examples, button assembly 1902 may be attached to a stationary object, such as a wall and/or a piece of heavy machinery. For example, button assembly 1902 may be programmed to send an emergency stop signal to a piece of heavy machinery and near the object stationary to which button assembly 1902 is attached. Additionally or alternatively, button assembly 1902 may be attached to a vehicle, such as the dashboard of a motor vehicle.

Figure 20:
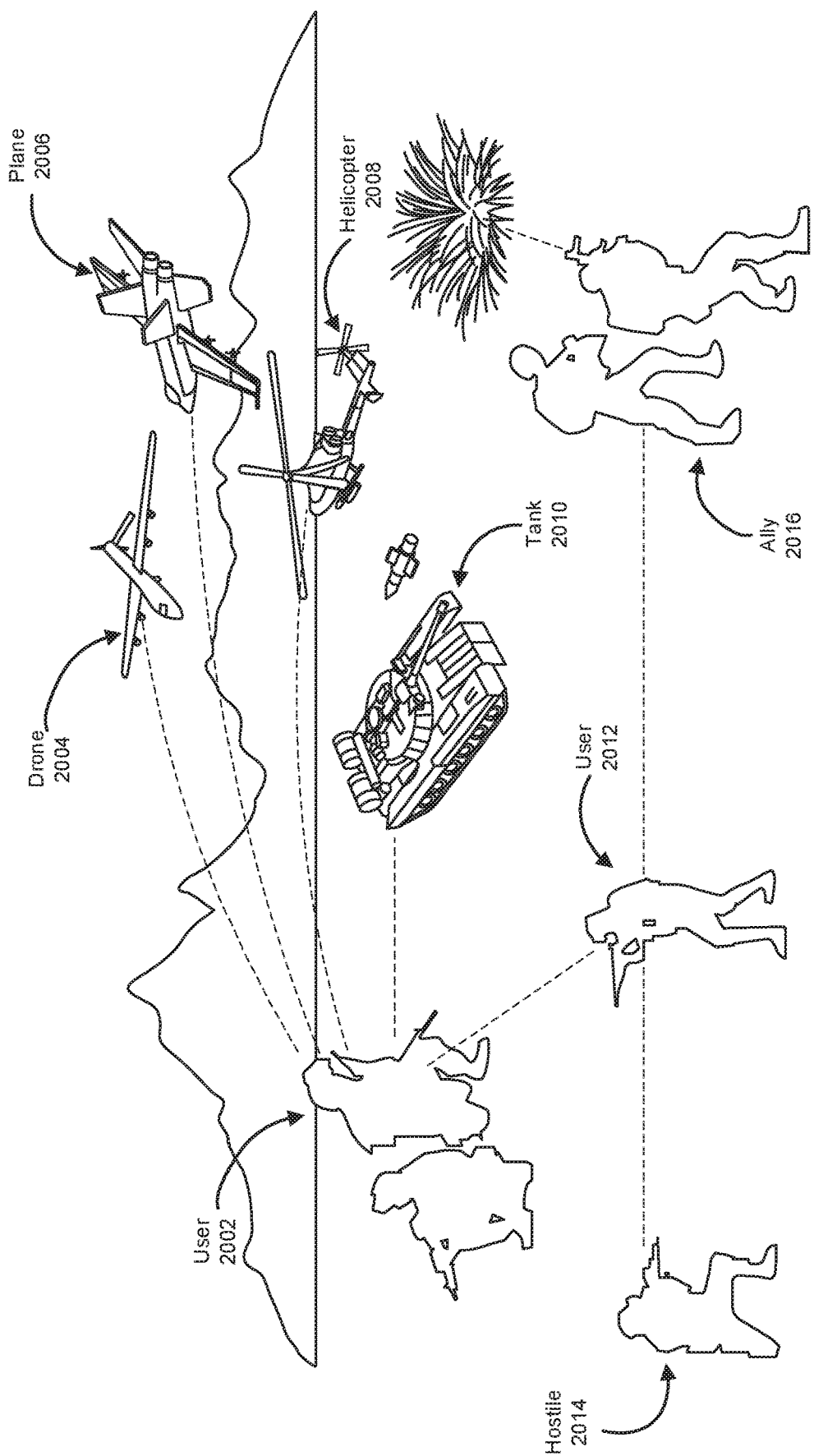
FIG. 20 is an illustration of an example context for a button assembly.

FIG. 20 is a diagram of example actions performed by a button assembly in context. In some examples, a user 2002 may program a button assembly to control a drone 2004, open a communication channel with a plane 2006, open a communication channel with a helicopter 2008, and/or open a communication channel with a tank 2010. For example, user 2002 may program the button assembly so that a single press with the dial at position one launches drone 2004, a double press with the dial at position one displays up a video feed from drone 2004 on a heads-up-display worn by user 2002, and/or a long press with the dial at position one cycles through preprogrammed behaviors for drone 2004. In one example, user 2002 may program the button assembly so that a single press with the dial at position two opens a communication channel with helicopter 2008 and/or a double press with the dial at position two sends a prerecorded "need medical evacuation now" message and/or the precise position of user 2002 to helicopter 2008. In some examples, user 2002 may program the button assembly to display in a graphical user interface pairing lines from plane 2006 and/or other aircraft to the targets of those aircraft. In one example, user 2002 may program the button assembly to zoom to the lowest level on a map displayed in a user interface in response to a single press when the dial is at position four and/or to zoom to a preselected zoom level in response to a double press when the dial is at position four.

In some examples, a user 2012 may also be equipped with a button assembly. In one example, user 2012 may program the button assembly to open a communication channel to user 2002, display, record, and/or send data about hostile 2014, and/or open a communication channel to ally 2016. For example, user 2012 may program the button assembly so that a single press with the dial at position three displays opens an interface on an additional device that enables user 2012 to tag hostile 2014 and/or ally 2016 and/or a double press with the dial at position three sends information about any tagged hostiles or allies, including hostile 2014 and/or ally 2016, to user 2012. In one example, user 2012 may program the button assembly to activate or deactivate weapon effect rings on a visual display in response to a single press with the dial at position five.

Figure 21:
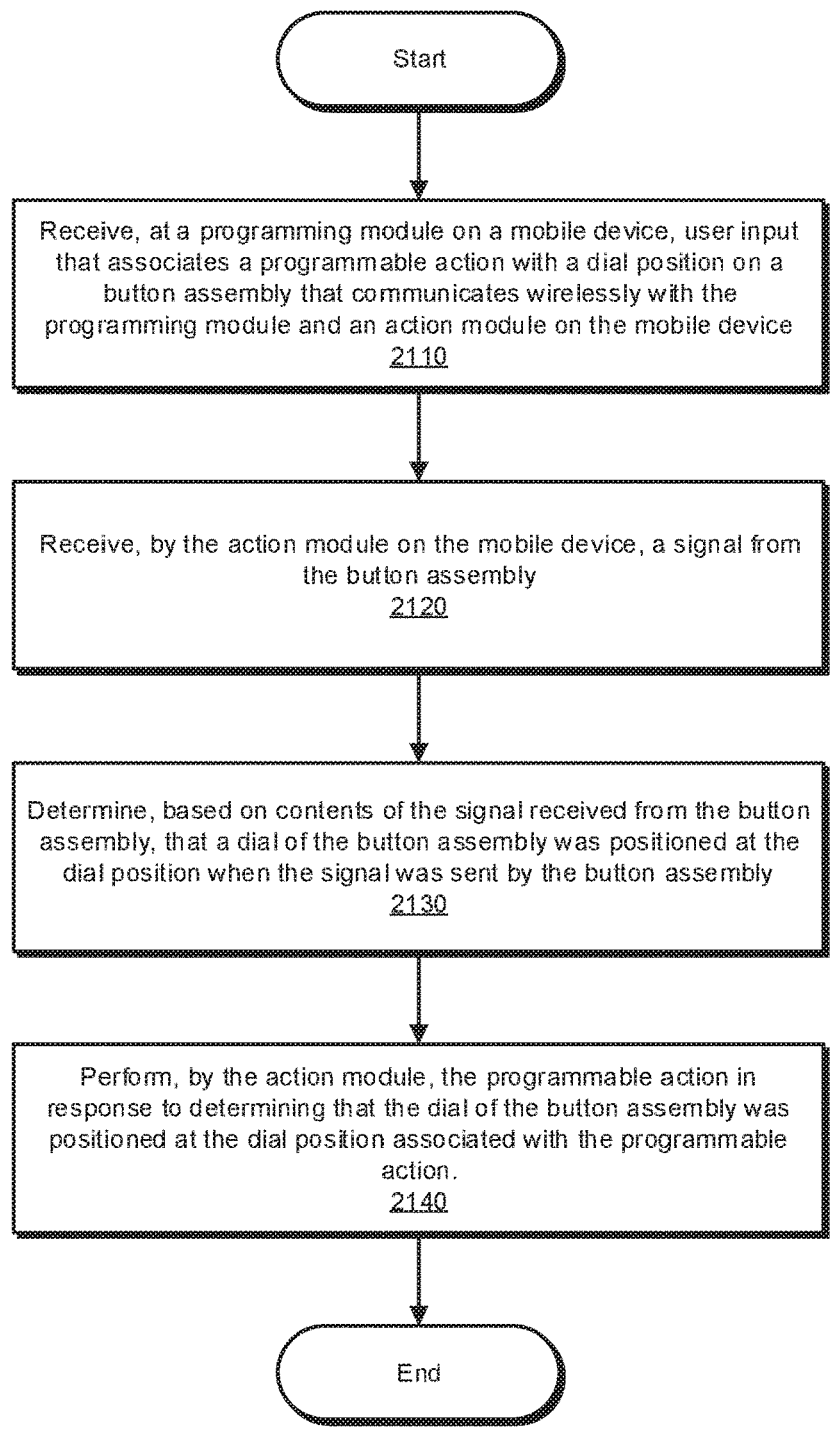
FIG. 21 is a flow diagram of a method for configuring programmable buttons.

FIG. 21 is an example computer-implemented method 2100 for configuring a programmable button. In one example, at step 2110, the systems described herein may receive, at a programming module on a mobile device, user input that associates a programmable action with a dial position on a button assembly that communicates with the programming module and an action module on the mobile device.

The button assembly may communicate with the programming module in a variety of ways. In some embodiments, the button assembly may communicate wirelessly. In some examples, the button assembly may communicate via one or more short-range wireless communication media, such as a near field communication, BLUETOOTH, and/or near field magnetic induction. Additionally or alternatively, the button may communicate via a wired communication medium such as a fiber optic cable and/or any other suitable type of cable.

The systems described herein may receive the user input in a variety of ways. In one example, the systems described herein may include a graphical user interface in a software application on a computing device. In some examples, the computing device may be a mobile device such as a laptop, tablet, smart phone, and/or wearable smart device. In other examples, the computing device may be a non-mobile device, such as a personal computer or a server. In some embodiments, a user interface may display a visual representation of the dial and/or chassis of a button assembly and/or may enable a user to associate actions with dial positions in part by selecting the relevant position on the representation displayed in the user interface. In one embodiment, a user interface for associating actions with dial positions and/or button press types may include a custom user interface designed to resemble the user interface of an application to which the action module is capable of sending signals.

In one example, a user may individually associate an action with each dial position and/or type of button press. In another example, the systems described herein may receive the user input that associates the programmable action with the dial position on the button assembly by receiving a preconfigured profile for position and action associations that associates the programmable action with the dial position. For example, a platoon commander may configure a set of associations between dial positions, button press types, and actions, save the set of associations to a profile, and distribute the profile to each person in the platoon for uploading to each person's mobile device. By receiving input via preconfigured profiles, the systems described herein may enable users to standardize button settings for each user within a group and/or enable users to quickly configure their buttons by installing the profile rather than configuring each association individually. In some examples, profiles may specify settings for only some combinations of dial position and/or button press and/or a user may use multiple profiles and/or configure their button using a combination of profiles and custom configurations. For example, a user may install a profile that specifies associations for the first three button positions and may manually configure the remaining three button positions of a six-position button assembly.

In some examples, a user may record a sequence of actions and associate the sequence of actions with a button press. For example, a user may open a recording application, configure the recording application, and then initiate recording via the application, and may record this sequence of actions such that a single button press triggers all of the actions in sequence. In some embodiments, the systems described herein may enable a user to edit recorded sequences of actions to add, remove, and/or reorder actions in the sequence. Additionally or alternatively, the systems described herein may present a user with a list of available actions that can be associated with button presses and/or dial positions. In one embodiment, the systems described herein may scan a mobile device for installed applications and/or paired devices and may base the list of available actions off the installed applications and/or paired devices.

In some examples, a user may associate different actions with each dial position and/or combination of dial position and button press type. In other examples, a user may associate the same action with multiple dial positions and/or button press types. For example, a user may associate a different action with each of a normal press, long press, and double press for the first dial position but may associate the same action with each type of press for the second dial position. In another example, a user may associate the same action with the first two dial positions and a different action with the third dial position. For example, a user may associate a commonly-used action with several dial positions in order to increase the likelihood that the action is selected if the user turns the dial imprecisely.

In some embodiments, the systems described herein may associate an action with all types of button presses for the same dial position unless otherwise specified. For example, if a user associates the action "signal my head-mounted camera to begin recording" with the first dial position, the systems described herein may associate that action with a normal press, a long press, and/or a double press when the dial is at the first position. In other embodiments, the systems described herein may perform no action when receiving a button press type at a dial position that has no association for that button press type. For example, if a user associates the action "send vital signs of the patient in my ambulance to a server at the hospital" with a normal press at the second dial position and does not specify an association for a long press and/or double press at the second dial position, the systems described herein may not signal the walkie-talkie when receiving a long press and/or a double press at the second dial position. In some embodiments, the systems described herein may allow a user to specify whether or not to default to associating an action with all button press types for a dial position.

At step 2120, the systems described herein may receive, by the action module on the mobile device, a signal from the button assembly.

The systems described herein may receive the signal in a variety of ways. In some embodiments, the systems described herein may receive the signal directly from the button assembly. In other embodiments, the systems described herein may receive the signal via an additional device. In some embodiments, the systems described herein may receive the signal via a near field communication medium. In one embodiment, the systems described herein may receive the signal via BLUETOOTH. Additionally or alternatively, the systems described herein may receive the signal via near field magnetic induction.

In some embodiments, the same application that receives the user input to associate actions with dial positions may also receive the signal from the button. In other embodiments, separate applications may receive user input and/or receive signals from the button. In one embodiment, the same device may receive the user input and the signals from the button. For example, a mobile device may enable a user to associate dial positions with actions and may also receive signals from the button. In another embodiment, separate devices may receive the user input and the signals from the button. For example, a laptop computer may receive user input that associates dial positions with actions and may send the association information to a smart watch or other wearable device that receives signals from the button and performs actions based on the signals.

In some embodiments, the button may send a signal when the button is pressed. In one embodiment, the button may send a signal when the dial position is changed. Additionally or alternatively, the button may send a signal at periodic intervals. For example, the button may send a signal every minute, ten minutes, or half hour that verifies to the computing device that the button is still functioning and in communication with the computing device.

At step 2130, the systems described herein may determine, based on the contents of the signal received from the button assembly, that a dial of the button assembly was positioned at the dial position when the signal was sent by the button assembly.

The systems described herein may use a variety of formats for the contents of the signal. In one embodiment, the contents of the signal may include data uniquely identifying the button assembly and data identifying the dial position. In some examples, the contents of the signal may include data identifying a type of button press that triggered the button assembly to send the signal. In some embodiments, the contents of the signal may also include information on button health, such as the remaining battery life of the button. In some embodiments, the contents of the signal may include a string.

In one embodiment, the string may include a set of bytes at a predetermined position that uniquely identify the button, a set of bytes at a predetermined position that identify the type of button press, and/or a set of bytes that identify a dial position. For example, the string may contain a byte that identifies the length of the string, a byte with a zero value, two bytes that identify the manufacturer of the button, a byte that contains a beacon identifier of the button, sixteen bytes that include a universally unique identifier of the button, a byte that contains a non-zero value only in the case of a single button press, a byte that contains a non-zero value only in the case of a double press, a byte that contains a non-zero value only in the case of a long press, one or more bytes that encode the position of the dial, a byte that describes the current voltage of the battery of the button, and/or a byte that includes a received signal strength indicator.

At step 2140, the systems described herein may perform, by the action module, the programmable action in response to determining that the dial of the button assembly was positioned at the dial position associated with the programmable action.

The systems described herein may perform the programmable action in a variety of ways. In some embodiments, the systems described herein may send a signal to a software application installed on the same device that hosts the action module. In some examples, the action module may be installed on a mobile phone and may send a signal to another application on the mobile phone to send a predetermined text message to a predetermined contact or group of contacts, initiate and/or terminate a voice and/or video call with a predetermined contact or group of contacts, begin and/or stop recording audio and/or video, and/or send additional signals to another application and/or device that communicates with the application. For example, the action module may send a signal to a software application that directs a wearable camera that triggers the software application to send a signal directing the wearable camera to begin recording video.

Additionally or alternatively, the systems described herein may perform the programmable action by wirelessly sending a predetermined signal to at least one additional device. In one example, the additional device may include a wearable heads-up-display and sending the predetermined signal to the wearable heads-up-display may trigger the wearable heads-up-display to display information to the user on the wearable heads-up-display. In another example, the additional device may include a drone and/or set of drones and sending the predetermined signal to the drone may trigger the drone to launch, move to a predetermined position (absolute or relative to the button), and/or perform a predetermined action.

In some examples, the systems described herein may perform a programmable action in response to a combination of multiple button presses. For example, the systems described herein may be programmed to perform an action in response to a series of button presses of particular types at particular dial positions in a specific order. In one example, the systems described herein may open a lock and/or arm a device after receiving single presses at each of the first, third, fourth, and sixth positions, in that order. By performing actions in response to combinations and/or series of presses, the systems described herein may function as a type of combination lock.

In some examples, the systems described herein may receive input that associates a new action with an already-configured dial position and/or button press type. For example, the systems described herein may receive at the programming module on the mobile device, new user input that replaces the programmable action with a new programmable action associated with the dial position on the button assembly. The systems described herein may then later receive, by the action module on the mobile device, an additional signal from the button assembly and may determine, based on contents of the additional signal received from the button assembly, that the dial of the button assembly was positioned at the dial position when the additional signal was sent by the button assembly. In response to determining that the dial of the button assembly was positioned at the dial position associated with the new programmable action, the systems described herein may and perform, by the action module, the new programmable action. For example, a user may configure a button to send a signal to the onboard computer of their vehicle that launches a navigation application when the user double presses the button while the dial is at the first dial position. The user may later reconfigure the button to instead send a signal to a wearable headset that increases the volume of audio in the headset when the user double presses the button while the dial is at the first dial position.

In some embodiments, the button may send a signal to the device configured with the programming module and/or action module that initiates a pairing process between the button and the device. In one embodiment, the systems described herein may pair the button assembly with the mobile device by sending, in response to determining that the user has activated a pairing function, a signal from the button assembly to any devices within a predetermined radius. In some examples, the signal may describe the current location of the button assembly. Additionally or alternatively, the signal may include other information, such as an identifier of the button assembly, a manufacturer of the button assembly, and/or status information about the button assembly. In some embodiments, the button assembly may only send a signal that initiates a pairing process in response to a user activating the pairing function.

After the button assembly has sent the signal, the mobile device may receive the signal and may display, by the programming module on the mobile device, the current location of the button assembly relative to the current location of the mobile device. In some embodiments, the programming module may display the current location by displaying a numerical distance (e.g., in meters) and/or a direction. Additionally or alternatively, the programming module may display a map with the location of the mobile device and/or button assembly. In some examples, the systems described herein may then pair the button assembly with the mobile device in response to receiving a confirmation from the user.

In some embodiments, the systems described herein may pair more than one button assembly with the same mobile device and/or more than one mobile device with the same button assembly. For example, a user may wear two button assemblies each configured with different actions that are each paired with the same mobile device. In another example, a single button assembly may be paired with both with a mobile phone and a laptop computer.

As explained above, the systems described herein may enable a user to quickly interface with a multitude of different applications and devices in inclement environmental conditions using a purely tactile system that does not require the user to take their eyes off their current activity. In some examples, a user may configure a programmable button assembly to perform actions that would otherwise require the user to perform multiple steps using a different user interface, enabling the user to perform the selected actions significantly more quickly. In dangerous conditions such as battlefield or emergency response situations, the systems described herein may increase the safety of users by enabling users to configure and/or activate devices with minimal disruption to the user's other activities.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a transmitter capable of sending a signal to a device that is configured with an action module that interprets the signal and a programming module;
    a dial that is adjustable to a plurality of positions, wherein each position is matched by the programming module with a programmable action; and a button that is communicatively coupled to the transmitter and that, when pressed, triggers the transmitter to send to the device the signal, wherein the signal indicates a current position of the dial, such that the action module activates a programmable action associated with the current position of the dial in response to the button being pressed.

2. The apparatus of claim 1, wherein the dial is annular and the button is located within a cavity defined by the dial.

3. The apparatus of claim 2, wherein an outer face of the button is within the cavity defined by the dial such that the button defines a base of the cavity.

4. The apparatus of claim 1, wherein the dial comprises a different tactile symbol at each of at least two dial positions.

5. The apparatus of claim 1, further comprising a chassis assembly that is coupled to at least one of the dial and the button and that comprises at least one attachment point for a strap.

6. The apparatus of claim 1, further comprising a chassis assembly that is coupled to at least one of the dial and the button and that comprises an adhesive backing.

7. The apparatus of claim 1, wherein the button comprises a press pad and a dome switch that provide tactile feedback to a user when the user presses the button.

8. The apparatus of claim 1, wherein the signal comprises a wireless signal.

9. A system comprising:
a button assembly that comprises:
a transmitter capable of sending a signal to a device that is configured with an action module that interprets the signal and a programming module;
a dial that is adjustable to a plurality of positions, wherein each position is matched by the programming module with a programmable action;
a button that is communicatively coupled to the transmitter and that, when pressed, triggers the transmitter to send to the device the signal, wherein the signal indicates a current position of the dial, such that the action module activates a programmable action associated with the current position of the dial in response to the button being pressed; and
the programming module on the device that, in response to an input from a user, associates the programmable action associated with the current position of the dial with the current position of the dial; and
the action module performs the programmable action associated with the current position of the dial in response to receiving the signal indicating the current position of the dial from the button assembly.

10. The system of claim 9, wherein the programming module enables the user to associate a different programmable action for a same position for the dial with each different type of button press within a set of types of button press.

11. The system of claim 9, wherein the programmable action associated with the current position of the dial triggers the action module to transmit an instruction to a software application to perform an action.

12. The system of claim 9, wherein:
the programming module on the device replaces, in response to receiving a new input from the user, the programmable action associated with the current position of the dial with a new programmable action associated with the current position of the dial on the button assembly; and
the action module: receives a new signal from the button assembly;
determines, based on contents of the new signal received from the button assembly, that the dial of the button assembly was positioned at the current position when the new signal was sent by the button assembly; and
performs the new programmable action in response to determining that the dial of the button assembly was positioned at the current position associated with the new programmable action.

13. The system of claim 9, wherein the button assembly is communicatively coupled to the device via a cable.

14. A computer-implemented method comprising:
receiving, at a programming module on a mobile device, user input from a user that associates a programmable action with a dial position on a button assembly that communicates with the programming module and an action module on the mobile device, wherein the mobile device is at least one of a smartphone or a tablet;
receiving, by the action module on the mobile device, a signal from the button assembly;
determining, based on contents of the signal received from the button assembly, that a dial of the button assembly was positioned at the dial position when the signal was sent by the button assembly;
performing, by the action module, the programmable action in response to determining that the dial of the button assembly was positioned at the dial position associated with the programmable action;
pairing the programming module on the mobile device with at least one device; and
performing at least one action on the at least one device, wherein the at least one action is controlled by the programming module;
receiving, by the action module on the mobile device, an additional signal from the button assembly;
determining, based on contents of the additional signal received from the button assembly, that the dial of the button assembly was positioned at another dial position when the additional signal was sent by the button assembly;
performing, by the action module, an additional programmable action in response to determining that the dial of the button assembly was positioned at the other dial position; and
performing, at least one additional action on at least one additional device, wherein the at least one additional action is controlled by the programming module.

15. The computer-implemented method of claim 14, wherein performing the programmable action comprises wirelessly sending a predetermined signal to the at least one additional device.

16. The computer-implemented method of 15, wherein:
the at least one additional device comprises a wearable heads-up-display; and
sending the predetermined signal to the wearable heads-up-display triggers the wearable heads-up-display to display information to the user on the wearable heads-up-display.

17. The computer-implemented method of claim 14, further comprising pairing the button assembly with the mobile device by:
sending, in response to determining that the user has activated a pairing function, a pairing signal from the button assembly to any devices within a predetermined radius, wherein the pairing signal describes a current location of the button assembly;
receiving, by the mobile device, the pairing signal that describes the current location of the button assembly;

displaying, by the programming module on the mobile device, the current location of the button assembly relative to a current location of the mobile device in response to receiving the pairing signal that describes the current location of the button assembly; and pairing the button assembly with the mobile device in response to receiving a confirmation from the user.

18. The computer-implemented method of claim 14, wherein receiving, at the programming module on the mobile device, the user input that associates the programmable action with the dial position on the button assembly comprises receiving a preconfigured profile for position and action associations that associates the programmable action with the dial position.

19. The computer-implemented method of claim 14, wherein the contents of the signal comprise data identifying a type of button press that triggered the button assembly to send the signal.

20. The computer-implemented method of claim 14, further comprising:

receiving, at the programming module on the mobile device, a new user input that replaces the programmable action with a new programmable action associated with the dial position on the button assembly;

receiving, by the action module on the mobile device, a second additional signal from the button assembly;

determining, based on contents of the second additional signal received from the button assembly, that the dial of the button assembly was positioned at the dial position when the second additional signal was sent by the button assembly; and performing, by the action module, the new programmable action in response to determining that the dial of the button assembly was positioned at the dial position associated with the new programmable action.

* * * * *